(12) United States Patent
Morioka

(10) Patent No.: US 10,443,888 B2
(45) Date of Patent: Oct. 15, 2019

(54) AIR CONDITIONER

(71) Applicant: Mitsubishi Electric Corporation, Tokyo (JP)

(72) Inventor: Reiji Morioka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 286 days.

(21) Appl. No.: 15/533,395

(22) PCT Filed: Mar. 6, 2015

(86) PCT No.: PCT/JP2015/056709
§ 371 (c)(1),
(2) Date: Jun. 6, 2017

(87) PCT Pub. No.: WO2016/143010
PCT Pub. Date: Sep. 15, 2016

(65) Prior Publication Data
US 2018/0051905 A1 Feb. 22, 2018

(51) Int. Cl.
*F24F 13/28* (2006.01)
*F24F 1/00* (2019.01)
(Continued)

(52) U.S. Cl.
CPC .............. *F24F 13/28* (2013.01); *B01D 46/48* (2013.01); *B03C 3/08* (2013.01); *B03C 3/12* (2013.01);
(Continued)

(58) Field of Classification Search
CPC combination set(s) only.
See application file for complete search history.

(56) References Cited

U.S. PATENT DOCUMENTS 5,060,717 A * 10/1991 Morita .................. F24F 1/0007 165/53
5,092,396 A * 3/1992 Murano ................ F24F 1/0007 165/119
(Continued)

FOREIGN PATENT DOCUMENTS

EP 1988342 A1 11/2008
EP 2 700 451 A2 2/2014
(Continued)

OTHER PUBLICATIONS

Office Action dated May 16, 2018 issued in corresponding SG patent application No. 11201704959.
(Continued)

*Primary Examiner* — Amber R Orlando
*Assistant Examiner* — Sonji Turner
(74) *Attorney, Agent, or Firm* — Posz Law Group, PLC

(57) ABSTRACT

In an air conditioner, an air cleaner includes a charging unit for charging particles in the air and a dust collecting unit for collecting the particles charged by the charging unit by an electrostatic force. A filter cleaning device includes a device body to house a filter for capturing dust in the air in a movable form, and a part of the device body forms a supporting part to support the air cleaner. An indoor unit body houses the filter cleaning device, and houses the air cleaner by supporting it by the supporting part.

12 Claims, 23 Drawing Sheets

(51) Int. Cl.
  *F24F 13/20* (2006.01)
  *F24F 13/22* (2006.01)
  *B03C 3/41* (2006.01)
  *B03C 3/47* (2006.01)
  *B03C 3/82* (2006.01)
  *B01D 46/48* (2006.01)
  *B03C 3/155* (2006.01)
  *F24F 1/0025* (2019.01)
  *B03C 3/08* (2006.01)
  *B03C 3/12* (2006.01)
  *F24F 1/0007* (2019.01)
  *F24F 3/16* (2006.01)
  *F24F 1/0057* (2019.01)
  *F24F 1/0076* (2019.01)

(52) U.S. Cl.
  CPC .............. *B03C 3/155* (2013.01); *B03C 3/41* (2013.01); *B03C 3/47* (2013.01); *B03C 3/82* (2013.01); *F24F 1/0007* (2013.01); *F24F 1/0025* (2013.01); *F24F 1/0057* (2019.02); *F24F 1/0076* (2019.02); *F24F 3/166* (2013.01); *F24F 13/20* (2013.01); *F24F 13/22* (2013.01); *B03C 2201/04* (2013.01); *F24F 2003/1635* (2013.01); *F24F 2003/1639* (2013.01); *F24F 2013/221* (2013.01); *Y02A 50/21* (2018.01)

(56) References Cited

U.S. PATENT DOCUMENTS

| | | | | |
|---|---|---|---|---|
| 5,564,495 A * | 10/1996 | Yoshihashi | ............ | F24F 13/30 165/122 |
| 5,758,719 A * | 6/1998 | Yoshihashi | ............ | F24F 13/30 165/119 |
| 6,092,387 A * | 7/2000 | Hironaka | ............... | B03C 3/011 62/317 |
| 6,129,781 A * | 10/2000 | Okamoto | ................. | B03C 3/12 96/25 |
| 6,136,074 A * | 10/2000 | Okamoto | ............... | B03C 3/017 96/62 |
| 6,164,082 A * | 12/2000 | Okamoto | ............... | B03C 3/455 62/317 |
| 6,338,382 B1 * | 1/2002 | Takahashi | ............ | F24F 1/0007 165/96 |
| 6,635,106 B2 * | 10/2003 | Katou | ...................... | B03C 3/12 96/67 |
| 6,725,684 B2 * | 4/2004 | Lee | ...................... | F24F 1/0007 62/298 |
| 6,729,154 B2 * | 5/2004 | Takashima | ........... | B01D 46/0055 282 |
| 7,258,730 B2 * | 8/2007 | Choi | ............ | B03C 3/41 95/73 |
| 7,261,767 B2 * | 8/2007 | Choi | ......................... | B03C 3/32 96/69 |
| 7,266,971 B2 * | 9/2007 | Kang | ................... | F24F 1/0007 62/317 |
| 7,350,371 B2 * | 4/2008 | Lee | ...................... | F24F 1/0007 62/317 |
| 7,670,414 B2 * | 3/2010 | Cha | ...................... | B01D 46/12 96/398 |
| 7,722,707 B2 * | 5/2010 | Tanaka | ..................... | A61L 9/16 96/57 |
| 7,827,810 B2 * | 11/2010 | Hur | ...................... | F24F 1/0007 62/126 |
| 8,038,517 B2 * | 10/2011 | Shibuya | ............. | B01D 46/0065 454/187 |
| 9,802,207 B2 * | 10/2017 | Park | ........................ | F24F 3/166 |
| 10,281,161 B2 * | 5/2019 | Morioka | ................. | F24F 13/28 |
| 2004/0144249 A1 * | 7/2004 | Kang | .................... | F24F 3/1603 95/1 |
| 2006/0070526 A1 * | 4/2006 | Hong | ........................ | B03C 3/47 96/69 |

FOREIGN PATENT DOCUMENTS

| | | | | |
|---|---|---|---|---|
| EP | 2 700 452 A2 | 2/2014 | | |
| JP | 05-106859 A | 4/1993 | | |
| JP | 06-147528 A | 5/1994 | | |
| JP | 06-272888 A | 9/1994 | | |
| JP | 3046389 U | 12/1997 | | |
| JP | H10-128153 A | 5/1998 | | |
| JP | H11-094282 A | 4/1999 | | |
| JP | 2000-218192 A | 8/2000 | | |
| JP | 2002-061862 A | 2/2002 | | |
| JP | 2002-061916 A | 2/2002 | | |
| JP | 2002-106952 A | 4/2002 | | |
| JP | 2004-085021 A | 3/2004 | | |
| JP | 2004-218990 A | 8/2004 | | |
| JP | 2005-074389 A | 3/2005 | | |
| JP | 2005-138034 A | 6/2005 | | |
| JP | 2005147546 A * | 6/2005 | | |
| JP | 2006046725 A * | 2/2006 | | |
| JP | 2006046727 A * | 2/2006 | | |
| JP | 2007-107803 A | 4/2007 | | |
| JP | 2007107803 A * | 4/2007 | | |
| JP | 2007-155240 A | 6/2007 | | |
| JP | 2007-170782 A | 7/2007 | | |
| JP | 2007170782 A * | 7/2007 | ........ | B01D 46/0054 |
| JP | 2007247960 A * | 9/2007 | | |
| JP | 2007247961 A * | 9/2007 | | |
| JP | 2008-111590 A | 5/2008 | | |
| JP | 2009-165957 A | 7/2009 | | |
| JP | 2009-186032 A | 8/2009 | | |
| JP | 2013-092285 A | 5/2013 | | |
| JP | 2014-041005 A | 3/2014 | | |
| JP | 2014-041754 A | 3/2014 | | |
| WO | 2016/143007 A1 | 9/2016 | | |

OTHER PUBLICATIONS

Office Action dated May 16, 2018 issued in corresponding SG patent application No. 11201704965.
International Search Report of the International Searching Authority dated Jun. 9, 2015 for the corresponding international application No. PCT/JP2015/056698 (and English translation).
Extended European Search Report dated Mar. 9, 2017 issued in corresponding EP patent application No. 15878309.2.
Extended European Search Report dated Oct. 12, 2018 issued in corresponding EP patent application No. 15884507.3.
Office action dated Apr. 16, 2019 issued in corresponding CN patent application No. 201580077020.1 (and English translation thereof).
Office Action dated Dec. 5, 2017 issued in corresponding JP patent application No. 2017-504332 (and English translation).
Office Action dated Sep. 17, 2018 issued in corresponding U.S. Appl. No. 15/533,387.
International Search Report of the International Searching Authority dated Jun. 9, 2015 for the corresponding international application No. PCT/JP2015/056709 (and English translation).
Office Action dated Oct. 31, 2017 issued in corresponding JP patent application No. 2017-504334 (and English translation).

* cited by examiner

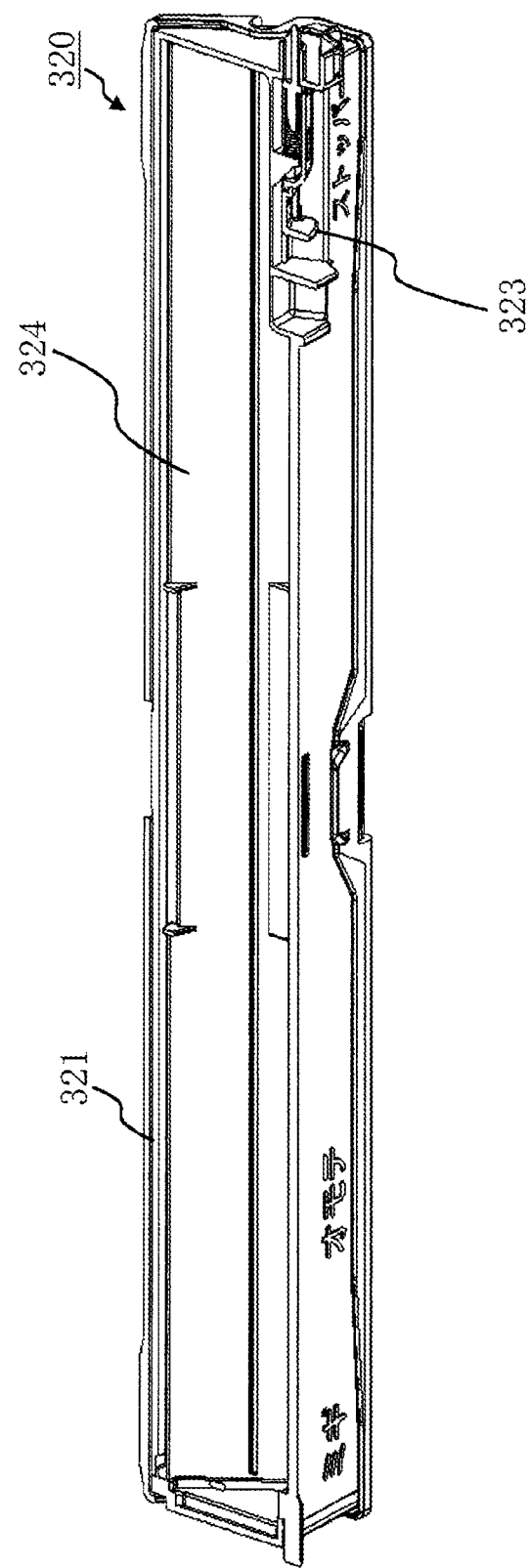

AIR CONDITIONER

This application is a U.S. national stage application of PCT/JP2015/056709 filed on Mar. 6, 2015, the disclosure of which is incorporated herein by reference.

TECHNICAL FIELD

The present invention relates to an air conditioner.

BACKGROUND ART

There has been an air conditioner having a discharge device provided between a suction port and a heat exchanger (for example, refer to Patent Literature 1). The discharge device charges microparticles in the air.

There has been an air conditioner having an electric dust collector provided between a suction port and a heat exchanger (for example, refer to Patent Literatures 2 and 4). The electric dust collector is also referred to as an air cleaner. The electric dust collector charges microparticles in the air, and then, collects the microparticles by an electrostatic force.

CITATION LIST

Patent Literature

Patent Literature 1: JP 2014-41754 A
Patent Literature 2: JP 2005-74389 A
Patent Literature 3: JP 2000-218192 A
Patent Literature 4: JP 6-272888 A

SUMMARY OF INVENTION

Technical Problem

The traditional electric dust collector (especially, referred to Patent Literature 2) includes a charging unit and a dust collecting unit. The charging unit includes a high-voltage potential discharge electrode and a ground potential counter electrode and charges the microparticles in the passing air. The dust collecting unit includes a high-voltage potential high-voltage electrode and a ground potential counter electrode and collects the microparticles by a suction force of the generated electrostatic force.

The high-voltage electrode of the dust collecting unit includes a number of electrodes which are vertically long plate members. The electrodes are provided as having a constant interval in the horizontal direction. The counter electrode of the dust collecting unit includes a number of electrodes which are vertically long plate members. The electrodes are arranged in the horizontal direction so as to be alternately arranged with the counter electrode of the dust collecting unit as having a predetermined interval.

The problem is that the "predetermined interval" is uneven.

The traditional electric dust collector includes power supply components. The traditional electric dust collector further includes a pair of terminals for electrically connecting the dust collecting unit with the power supply component.

It is necessary to provide a large space to store the power supply components and the terminals. Therefore, there is a problem in that it is difficult to miniaturize the electric dust collector.

The electric dust collector is not removable or electrical connection between the electric dust collector and an indoor unit is troublesome. Therefore, there is a problem in that the electric dust collector is not easily removed/attached.

Since the power supply component is positioned in an air trunk, there is a problem in that an efficiency of the air conditioner deteriorates.

The traditional electric dust collector (especially, referred to Patent Literature 4) is arranged near the heat exchanger such as a place above the heat exchanger provided in the indoor unit.

Therefore, there is a problem in that dew condensation may be generated in the electric dust collector. Also, there is a problem in that the electric dust collector prevents an air flow.

An object of the present invention is to provide an air cleaner apart from a heat exchanger.

Solution to Problem

An air conditioner according to one aspect of the present invention includes:

an air cleaner that includes a charging unit to charge particles in air and a dust collecting unit to collect the particles charged by the charging unit by an electrostatic force;

a filter cleaning device that includes a device body to house a filter for capturing dust in the air in a movable form, a part of the device body forming a supporting part to support the air cleaner, and an indoor unit body that houses the filter cleaning device and houses the air cleaner by supporting it by the supporting part.

Advantageous Effects of Invention

In the present invention, the air cleaner is supported by a part of the device body of the filter cleaning device. Therefore, the air cleaner can be provided apart from the heat exchanger.

BRIEF DESCRIPTION OF DRAWINGS

FIG. 23 is a perspective view of a lower part of the dust box illustrated by cutting the dust box of the filter cleaning device of the air conditioner according to the first embodiment.

DESCRIPTION OF EMBODIMENTS

Figure 1:
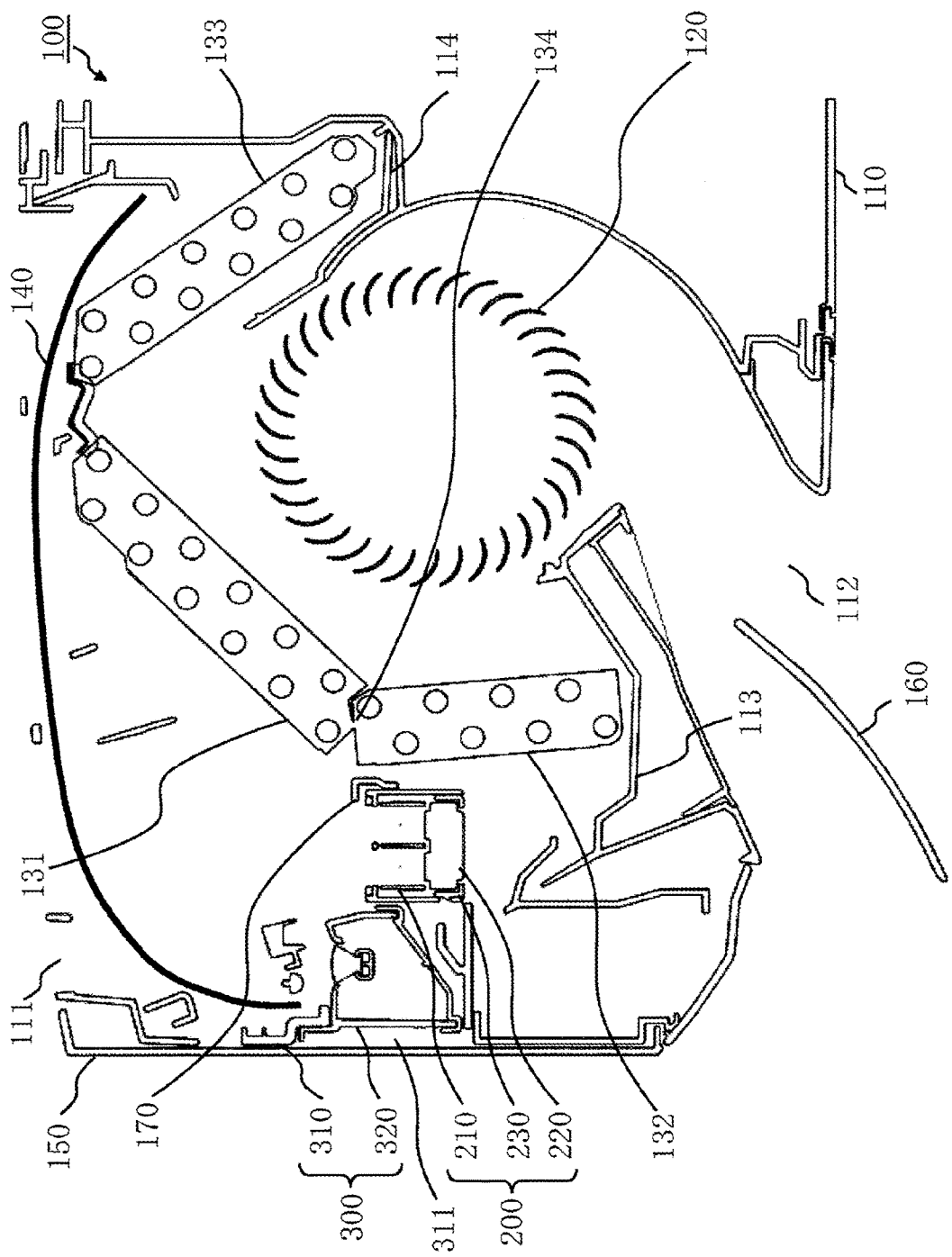
FIG. 1 is a cross sectional diagram of an indoor unit of an air conditioner according to a first embodiment.

An embodiment of the present invention is described below with reference to the drawings. In the drawings, the same or corresponding parts are denoted with the same reference numerals. In the description of the embodiment, description on the same or corresponding parts is appropriately omitted or simplified. Also, the material, the shape, the size, and the like of a structure of a device, an apparatus, a component, and the like can be appropriately changed within the scope of the present invention.

First Embodiment

A structure of an appliance according to the present embodiment and an operation of the appliance according to the present embodiment are sequentially described. After that, detail of the present embodiment and an effect of the present embodiment are sequentially described.

*Description of Structure*

A structure of an indoor unit 100 of an air conditioner which is an appliance according to the present embodiment is described with reference to FIG. 1.

As illustrated in FIG. 1, the indoor unit 100 of the air conditioner includes an indoor unit body 110, a blast fan 120, heat exchangers 131, 132, and 133, a filter 140, a front panel 150, a vertical wind direction variable vane 160, an air cleaner 200, and a filter cleaning device 300.

The indoor unit body 110 is a frame body of the air conditioner. The indoor unit body 110 houses the blast fan 120, the heat exchangers 131, 132, and 133, the filter 140, the air cleaner 200, and the filter cleaning device 300. In the present embodiment, the indoor unit body 110 removably houses the filter 140 and the air cleaner 200.

The front panel 150 is openably/closably attached on the front surface of the indoor unit body 110. A suction port 111 to suck the air from a room where the indoor unit 100 of the air conditioner is placed is provided on a side of the upper surface of the indoor unit body 110. A blowout port 112 to blow out the air into the room is provided on a side of the lower surface of the indoor unit body 110. The vertical wind direction variable vane 160 is rotatably attached to the blowout port 112. Also, a horizontal wind direction variable vane which is not shown is rotatably attached to the back of the blowout port 112.

The vertical wind direction variable vane 160 adjusts a vertical direction of an airflow blown from the blowout port 112. The horizontal wind direction variable vane adjusts a horizontal direction of the airflow blown from the blowout port 112.

The blast fan 120 is provided in the indoor unit body 110. The blast fan 120 sucks the air and blows out the sucked air. In the present embodiment, the blast fan 120 is a cross flow fan. The blast fan 120 may be changed into a plurality of propeller fans. The propeller fans are aligned in the horizontal direction of the indoor unit body 110. The preferable number of propeller fans is two to four. Each propeller fan may be an axial fan and a mixed flow fan.

The heat exchangers 131, 132, and 133 are arranged in the air trunk formed by the blast fan 120. A heat exchanger is divided into an upper heat exchanger and a lower heat exchanger, and is also divided into a front side heat exchanger and a rear side heat exchanger. The heat exchanger 131 corresponds to the upper heat exchanger. The heat exchanger 131 also corresponds to the front side heat exchanger. The heat exchanger 132 corresponds to the lower heat exchanger. The heat exchanger 133 corresponds to the rear side heat exchanger. In the present embodiment, the front side upper heat exchanger 131, the front side lower heat exchanger 132, and the rear side heat exchanger 133 are arranged in the air trunk from the suction port 111 of the indoor unit body 110 to the blowout port 112 so as to surround the blast fan 120. The rear side heat exchanger 133 may be omitted, and only the upper and lower heat exchangers 131 and 132 may be employed. Alternatively, a heat exchanger having other structure may be employed.

The front side upper heat exchanger 131, the front side lower heat exchanger 132, and the rear side heat exchanger 133 each exchange heat between the air and a refrigerant. The air is mainly sucked from the suction port 111 by the blast fan 120. The front side upper heat exchanger 131, the front side lower heat exchanger 132, and the rear side heat exchanger 133 each cool, heat or dehumidify the air by exchanging the heat.

A drain pan 113 to collect dew condensation water is arranged below the front side lower heat exchanger 132. A drain pan 114 is arranged below the rear side heat exchanger 133. The drain pans 113 and 114 are formed as a part of the indoor unit body 110.

The filter 140 is arranged between the suction port 111 of the indoor unit body 110 and the front side upper heat exchanger 131 and the rear side heat exchanger 133 so as to cover the whole suction port 111. In the present embodiment, the number of the filters 140 is two. The filters 140 are arranged as being divided into left and right. Each filter 140 captures dust in the air. The air is mainly sucked from the suction port 111 by the blast fan 120.

The filter cleaning device 300 is arranged between the front side upper and lower heat exchangers 131 and 132 and the front panel 150. The filter cleaning device 300 is placed for each filter 140. Therefore, in the present embodiment, the number of filter cleaning devices 300 is two. The filter cleaning device 300 automatically cleans the filter 140.

The number of filters 140 can be appropriately changed. The number of filter cleaning devices 300 can be changed according to the number of filters 140. That is, when the single filter 140 is used, the single filter cleaning device 300 is placed. When three or more filters 140 are used, three or more filter cleaning devices 300 are placed.

The filter cleaning device 300 includes a device body 310 and a dust box 320.

The device body 310 movably houses the filter 140.

The dust box 320 is removably attached to the front surface of the device body 310. The dust box 320 accumulates the dusts captured by the filter 140.

The indoor unit body 110 houses the air cleaner 200 behind the dust box 320. Therefore, an insertion port 311 is provided in the front surface of the device body 310, and both the air cleaner 200 and the dust box 320 are inserted into the insertion port 311. The air cleaner 200 is inserted into the insertion port 311 in a direction in which the longitudinal direction of the air cleaner 200 becomes horizontal. After being inserted into the insertion port 311, the air cleaner 200 is electrically connected to a terminal for power supply to be described by moving the air cleaner 200 downward, and the air cleaner 200 is attached to the indoor unit body 110. In this state, the longitudinal direction of the air cleaner 200 is horizontal. By moving the air cleaner 200 upward, the electrical connection between the air cleaner 200 and the terminal is released. After the electrical connection has been released, the air cleaner 200 is removed through the insertion port 311 to outside of the indoor unit body 110.

The air cleaner 200 is provided in a space between the suction port 111 of the indoor unit body 110 and the front side upper and lower heat exchangers 131 and 132. That is, the air cleaner 200 is arranged on the upstream side of the front side upper and lower heat exchangers 131 and 132 in the air trunk formed by the blast fan 120. In the present embodiment, the number of air cleaners 200 is one. The air cleaner 200 is arranged on the left side. The air cleaner 200 cleans the air which has passed through the filter 140. The size of the air cleaner 200 in the horizontal direction is preferably the same as that of the filter 140. When a difference between the size of the air cleaner 200 in the horizontal direction and that of the filter 140 is equal to or less than six cm, the two sizes can be assumed to be equal to each other.

The number of air cleaners 200 can be appropriately changed. The air cleaners 200 may be arranged on both the left and right sides.

In the present embodiment, the indoor unit body 110 houses the air cleaner 200 by positioning the center position of the air cleaner 200 in the height direction at a position lower than the connection part 134 between the upper heat exchanger 131 and the lower heat exchanger 132. Therefore, the air cleaner 200 hardly prevents the air flow. Also, the air cleaner 200 is easily attached/removed. The height direction of the air cleaner 200 means the vertical direction of the air cleaner 200.

The indoor unit body 110 houses the air cleaner 200 in front of and apart from the heat exchangers 131 and 132. Therefore, a metal part of the air cleaner 200 such as a terminal to be described is hardly cooled. Also, the dew condensation water of the heat exchangers 131 and 132 does not flow into the air cleaner 200. Therefore, the dew condensation hardly occurs in the air cleaner 200.

In the present embodiment, the indoor unit 100 of the air conditioner further includes a restriction unit 170.

The restriction unit 170 restricts a range in which the air cleaner 200 can enter the indoor unit body 110 in the depth direction in order to prevent contact between the air cleaner 200 and the heat exchangers 131 and 132. The depth direction of the indoor unit body 110 means the front-back direction of the indoor unit body 110.

The air cleaner 200 includes a charging unit 210, a dust collecting unit 220, and a frame part 230.

The charging unit 210 charges particles in the air. Mainly, the air has passed through a filter 140 after being sucked from the suction port 111 by the blast fan 120. Specifically, the particles in the air are bacteria, molds, and virus in the air.

The dust collecting unit 220 collects the particles charged by the charging unit 210 by using the electrostatic force. The electrostatic force is an electric field.

The frame part 230 fixes the charging unit 210 and the dust collecting unit 220.

\*\*\*Description of Operation\*\*\*

An operation of the air conditioner according to the present embodiment is described.

When the power is turned on, in an outdoor unit of the air conditioner which is not shown, a compressor compresses the refrigerant and discharges it.

In the indoor unit 100 of the air conditioner, the refrigerant discharged from the compressor is flown into the heat exchangers 131, 132, and 133. When the blast fan 120 rotates, the heat of indoor air sucked from the suction port 111 is exchanged with the refrigerant by the heat exchangers 131, 132, and 133 after the dust has been removed via the filter 140. At this time, the air which passes though the heat exchangers 131, 132, and 133 from the upstream to the downstream is cleaned by the air cleaner 200.

The indoor air heat exchanged by the heat exchangers 131, 132, and 133 is blown from the blowout port 112 into the room. At this time, the air is blown out in the direction according to the angles of the vertical wind direction variable vane 160 and the horizontal wind direction variable vane. A user of the air conditioner can set the angles of the vertical wind direction variable vane 160 and the horizontal wind direction variable vane by hand or by using a remote controller. When the indoor unit 100 of the air conditioner includes an infrared sensor which is not shown, the indoor unit 100 of the air conditioner detects temperature distribution and a position of a person in the room so that the angles of the vertical wind direction variable vane 160 and the horizontal wind direction variable vane can be automatically adjusted.

The series of operations is repeated. As a result, the dust is removed from the indoor air, and the indoor air is continuously cooled and warmed. Accordingly, an indoor air quality is changed.

\*\*\*Description of Detail\*\*\*

The detail of the present embodiment is described.

A structure of the air cleaner 200 is described with reference to FIGS. 2 to 8.

Figure 2:
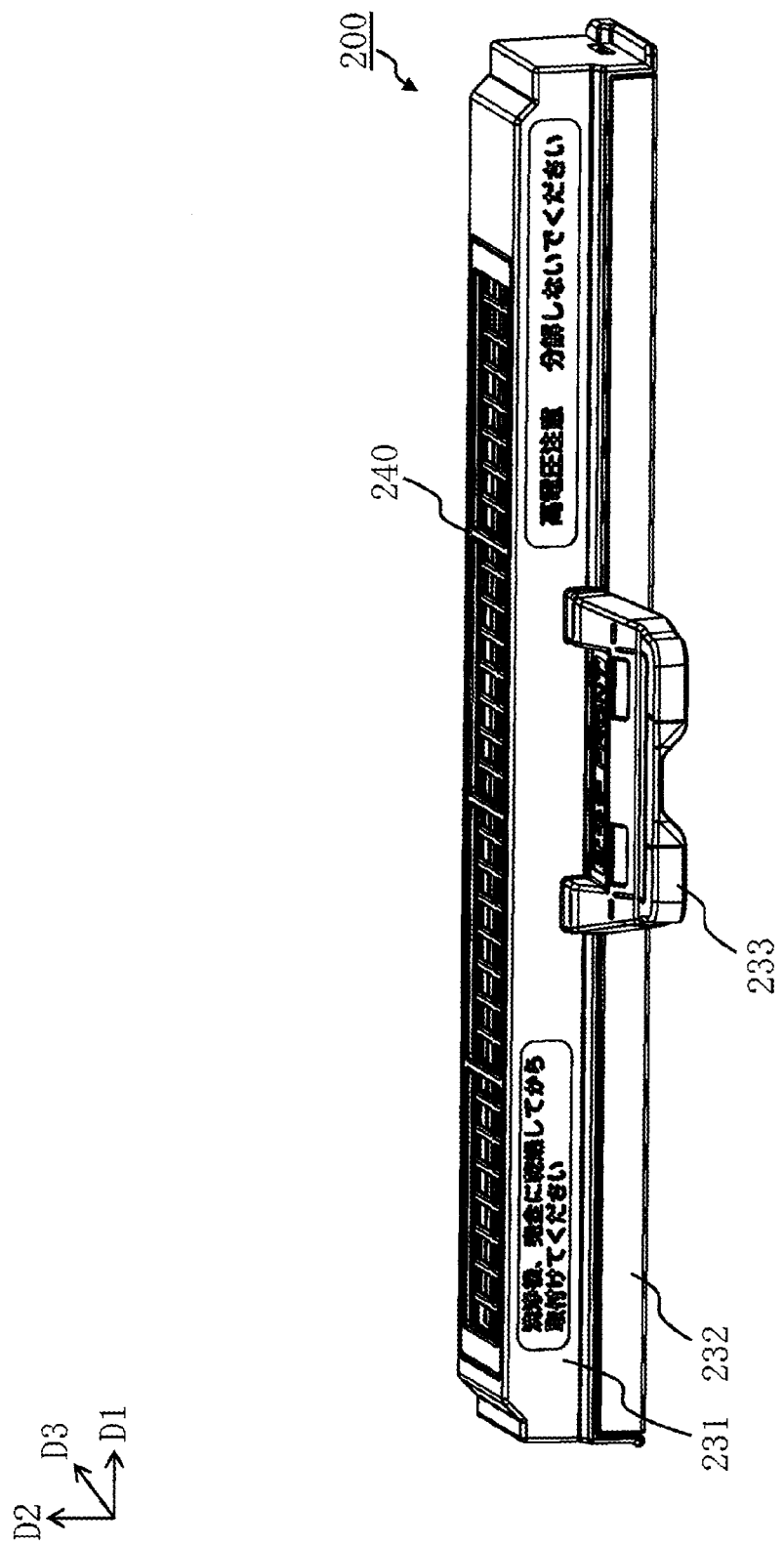
FIG. 2 is a perspective view of an air cleaner of the air conditioner according to the first embodiment.
Figure 3:
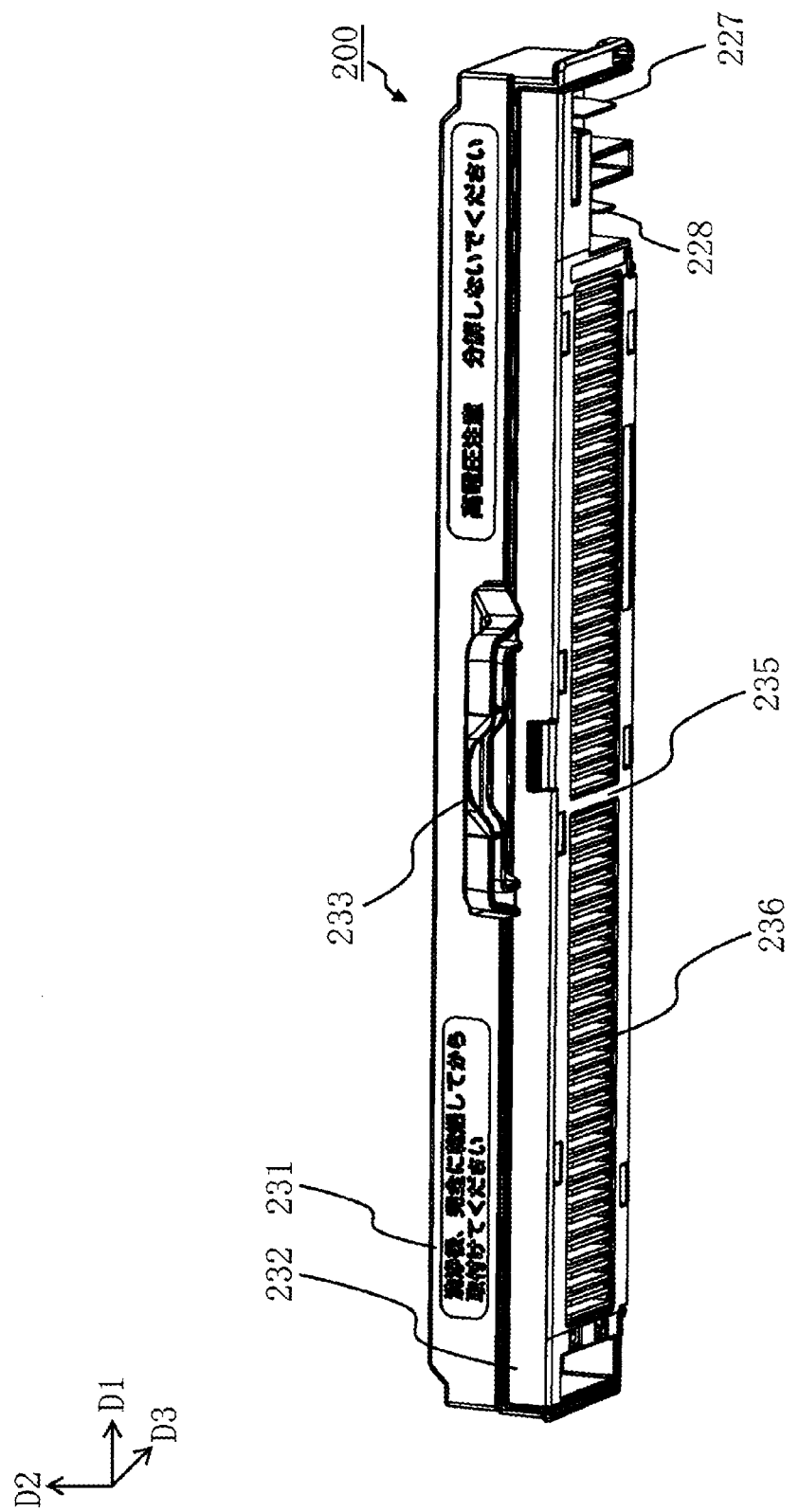
FIG. 3 is a perspective view of the air cleaner of the air conditioner according to the first embodiment.
Figure 4:
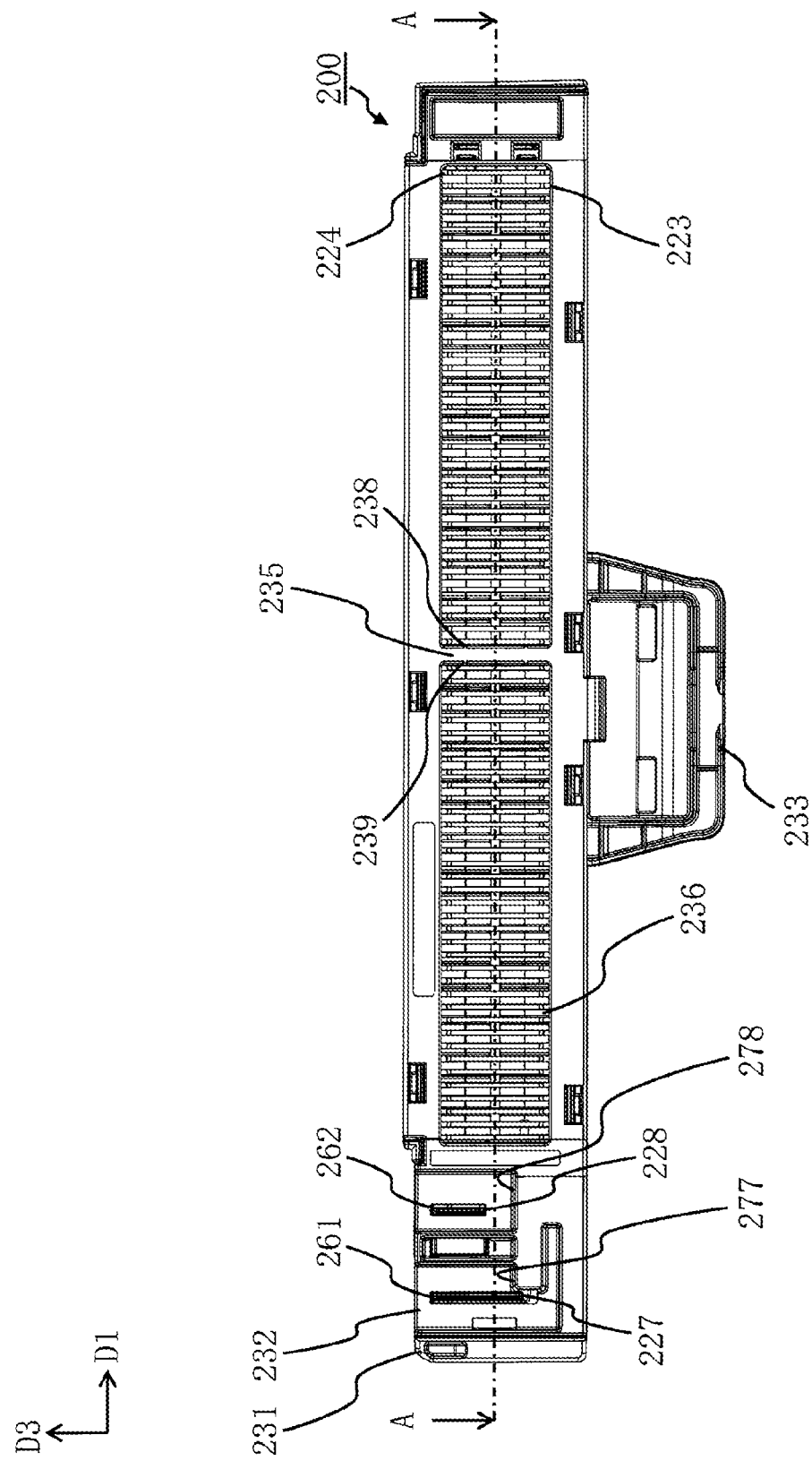
FIG. 4 is a bottom plan view of the air cleaner of the air conditioner according to the first embodiment.
Figure 5:
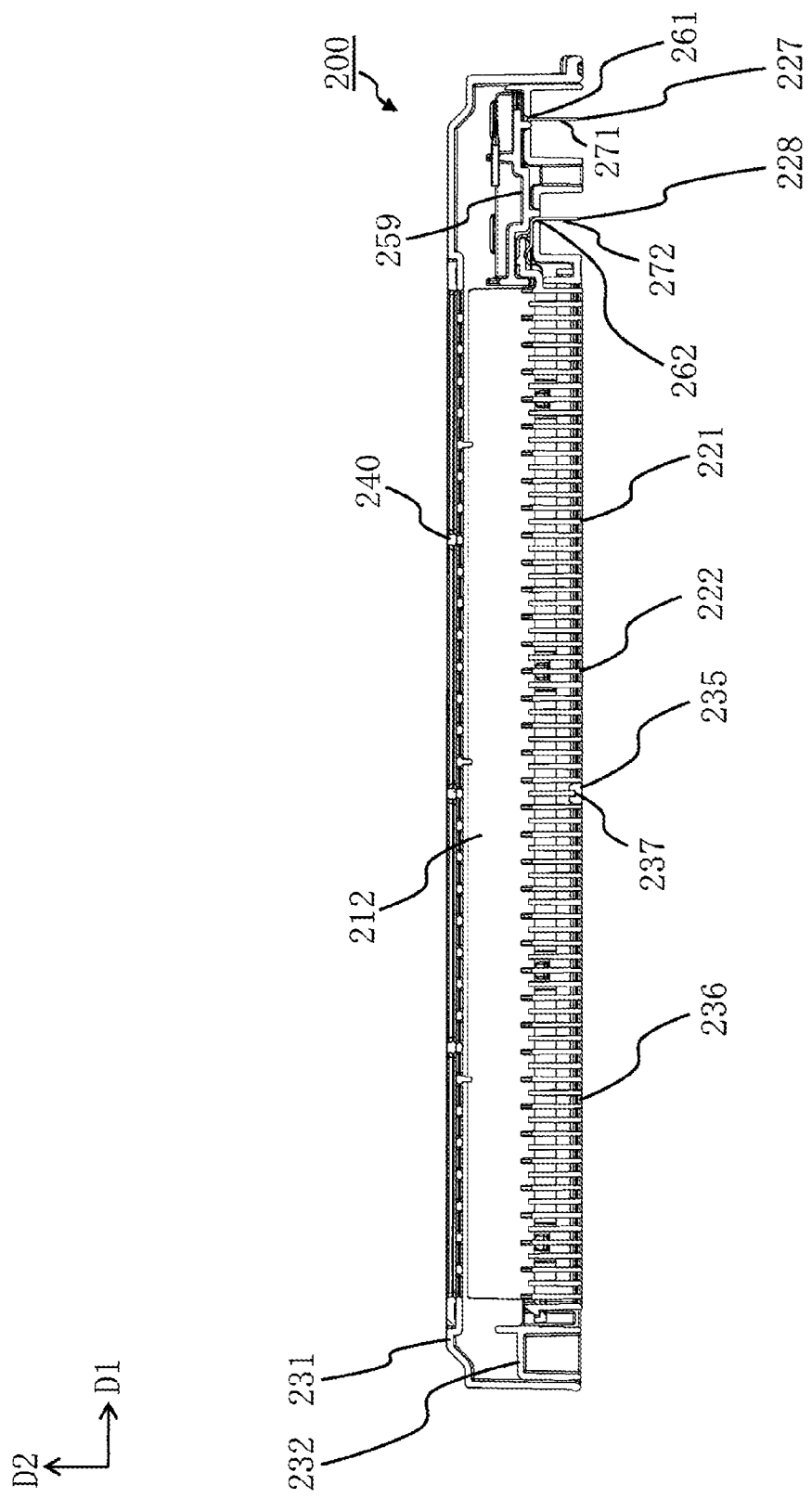
FIG. 5 is an A-A cross sectional diagram of the air cleaner of the air conditioner according to the first embodiment.
Figure 6:
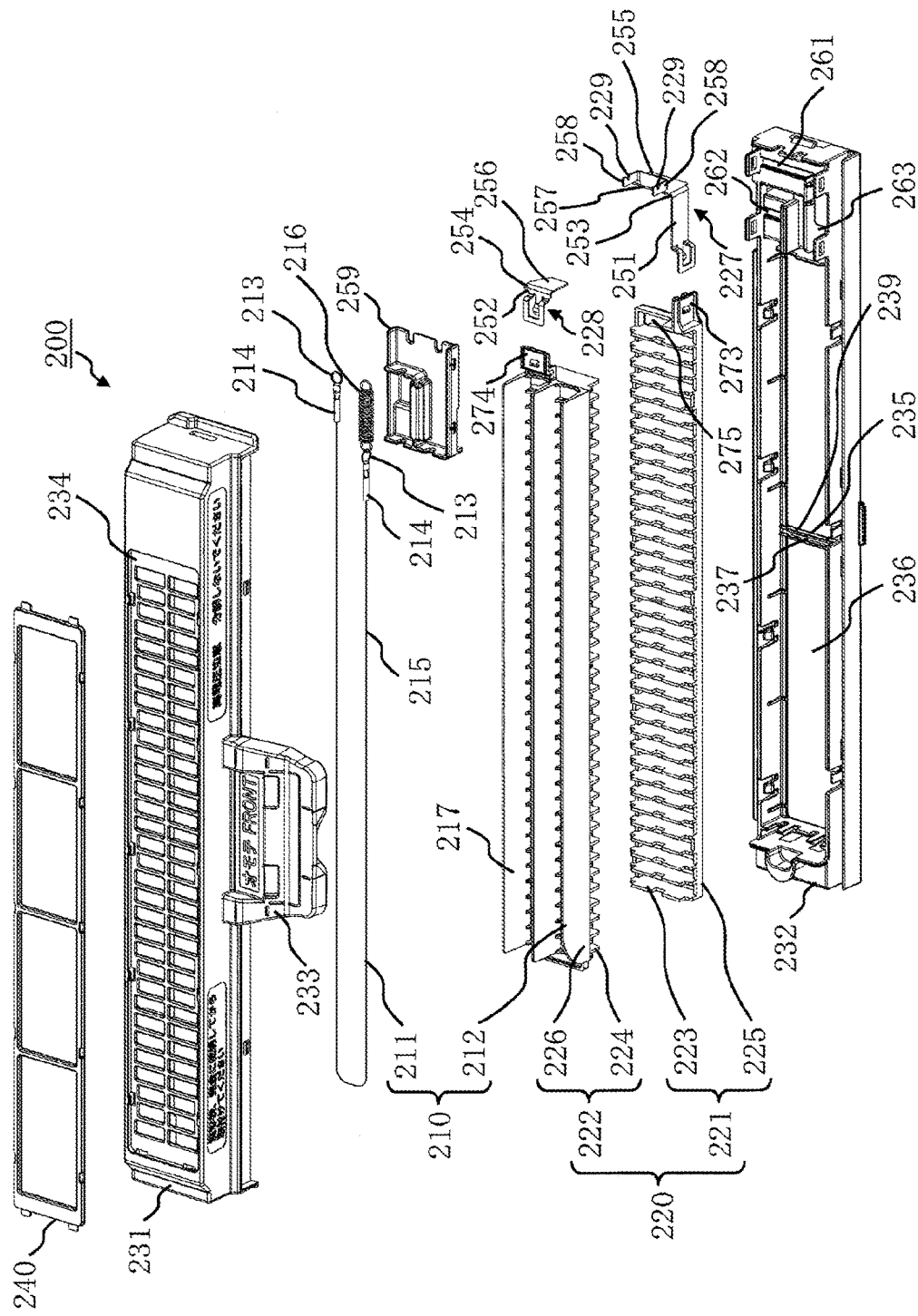
FIG. 6 is a disassembled perspective view of the air cleaner of the air conditioner according to the first embodiment.
Figure 7:
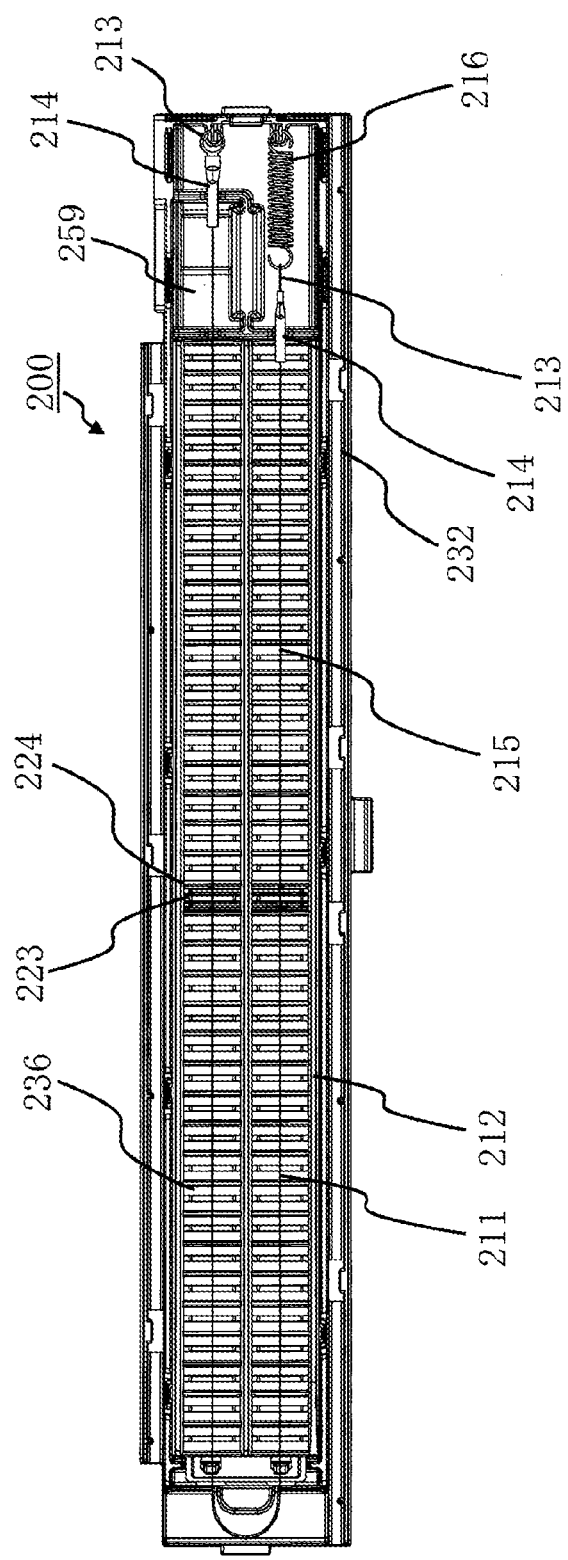
FIG. 7 is a plan view of the air cleaner, of which an upper frame is removed, of the air conditioner according to the first embodiment.
Figure 8:
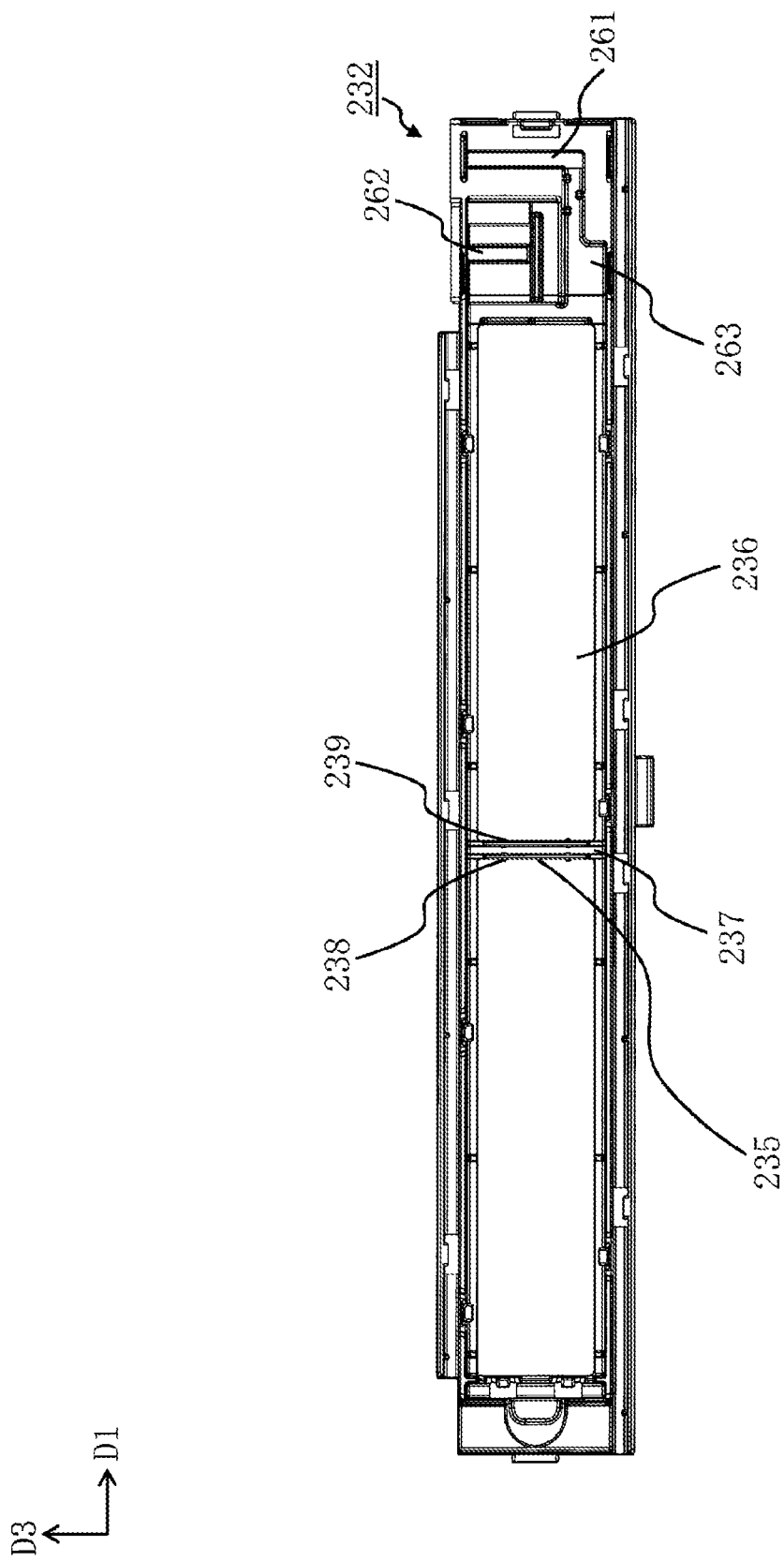
FIG. 8 is a plan view of a lower frame of the air cleaner of the air conditioner according to the first embodiment.

FIG. 2 is a diagram of the air cleaner 200 viewed obliquely from above and front side. FIG. 3 is a diagram of the air cleaner 200 viewed obliquely from below and front side. FIG. 4 is a diagram of the air cleaner 200 viewed from just below. FIG. 5 is a diagram of a cross section of the air cleaner 200 cut along an A-A line in FIG. 4. FIG. 6 is a diagram of the disassembled air cleaner 200 viewed obliquely from above and front side. FIG. 7 is a diagram of the air cleaner 200 of which an upper frame 231 to be described is removed viewed from right above. FIG. 8 is a diagram of a lower frame 232 to be described viewed from right above.

As described above, the air cleaner 200 includes the charging unit 210, the dust collecting unit 220, and the frame part 230. The air cleaner 200 further includes a prefilter 240.

The prefilter 240 captures the dust which cannot be captured by the filter 140.

The charging unit 210 is arranged below the prefilter 240, that is, on the downstream side of the prefilter 240. The charging unit 210 includes a discharge electrode 211 and a counter electrode 212.

The discharge electrode 211 includes a pair of ring-shaped terminals 213, a pair of tubes 214, and a single wire 215. The ring-shaped terminals 213 are connected to both sides of the wire 215. The tube 214 covers a connection part between the ring-shaped terminal 213 and the wire 215. A spring 216 is hooked to one ring-shaped terminal 213.

The counter electrode 212 includes a plurality of planar electrodes 217. The planar electrodes 217 are arranged in a third direction D3 with intervals from each other. The third direction D3 is described below. The wire 215 is provided between the planar electrodes 217 adjacent to each other. In the present embodiment, the number of planar electrodes 217 is three. Therefore, the wire 215 passes between the planar electrode 217 at the end in the third direction D3 and the planar electrode 217 in the middle in the third direction D3 and then folded back. After that, the wire 215 passes between the planar electrode 217 in the middle in the third direction D3 and the planar electrode 217 at the other end in the third direction D3.

The number of planar electrodes 217 can be appropriately changed. The number of times of folding of the wire 215 can be changed according to the number of planar electrodes 217.

The charging unit 210 generates the electric field by applying different voltages to the discharge electrode 211 and the counter electrode 212. The charging unit 210 charges the particles in the air passing through the electric field.

The voltage to be applied to the discharge electrode 211 is high. Specifically, a voltage of 6000 volts is applied to the discharge electrode 211. The voltage to be applied to the counter electrode 212 is low. Specifically, a voltage of zero volts is applied to the counter electrode 212. That is, the counter electrode 212 is grounded.

The dust collecting unit 220 is arranged below the charging unit 210, that is, on the downstream side of the charging unit 210. The dust collecting unit 220 includes a first electrode 221 and a second electrode 222.

A plurality of first plate-shaped electrodes 223 and a first connection member 225 are provided in the first electrode 221. The first plate-shaped electrodes 223 are arranged in a first direction D1 with intervals from each other. In the present embodiment, the first direction D1 is the horizontal direction of the air cleaner 200. When the air cleaner 200 is housed in the indoor unit body 110, the horizontal direction of the air cleaner 200 coincides with that of the indoor unit body 110. In the present embodiment, the number of first plate-shaped electrodes 223 is 37. The first connection member 225 couples the first plate-shaped electrodes 223 with each other. Accordingly, the plurality of first plate-shaped electrodes 223 is integrally provided in the first electrode 221.

A first terminal 227 is attached to one end of the first electrode 221 in the first direction D1. Specifically, the first terminal 227 is attached to the right end of the first electrode 221.

A plurality of second plate-shaped electrodes 224 and a second connection member 226 are provided in the second electrode 222. The second plate-shaped electrodes 224 and the first plate-shaped electrodes 223 are alternately arranged with intervals from each other. That is, the second plate-shaped electrodes 224 are arranged with intervals from each other in the first direction D1 similarly to the first plate-shaped electrodes 223. In the present embodiment, the number of second plate-shaped electrodes 224 is 38 which is one more than the number of first plate-shaped electrodes 223. The second connection member 226 couples the second plate-shaped electrodes 224 with each other. Accordingly, the plurality of second plate-shaped electrodes 224 is integrally provided in the second electrode 222. The second connection member 226 is overlapped with the first connection member 225 in a second direction D2. The second direction D2 is a direction perpendicular to the first direction D1. In the present embodiment, the second direction D2 is the vertical direction of the air cleaner 200. When the air cleaner 200 is housed in the indoor unit body 110, the vertical direction of the air cleaner 200 coincides with that of the indoor unit body 110.

A second terminal 228 is attached to one end of the second electrode 222 in the first direction D1. Specifically, the second terminal 228 is attached to the right end of the second electrode 222. The second terminal 228 is attached at a position separated from the first terminal 227 in the third direction D3. The third direction D3 is a direction perpendicular to both the first direction D1 and the second direction D2. In the present embodiment, the third direction D3 is the front-back direction of the air cleaner 200. When the air cleaner 200 is housed in the indoor unit body 110, the front-back direction of the air cleaner 200 coincides with that of the indoor unit body 110.

As described above, the air cleaner 200 is arranged at a position in front of the heat exchangers 131 and 132 and separated from the heat exchangers 131 and 132. The air vertically flows at this position. Also, as described above, the air cleaner 200 is attached to the indoor unit body 110 in a direction in which the longitudinal direction of the air cleaner 200 becomes horizontal. The direction in which a plate face of the planar electrode 217 extends, the direction in which a plate face of the first plate-shaped electrode 223 extends, and the direction in which a plate face of the second plate-shaped electrode 224 extends are the second direction D2. Therefore, when the air cleaner 200 is attached to the indoor unit body 110, the direction in which the plate face of the planar electrode 217 extends, the direction in which the plate face of the first plate-shaped electrode 223 extends, and the direction in which the plate face of the second plate-shaped electrode 224 extends are vertical. That is, when the air cleaner 200 is attached to the indoor unit body 110, all of the plate face of the planar electrode 217, the plate face of the first plate-shaped electrode 223, and the plate face of the second plate-shaped electrode 224 are extended along the direction in which the air flows. Therefore, the planar electrode 217, the first plate-shaped electrode 223, and the second plate-shaped electrode 224 hardly prevent the flow of the air, and the efficiency of the air conditioner is improved.

The number of first plate-shaped electrodes 223 can be appropriately changed. The number of second plate-shaped electrodes 224 can be changed according to the number of first plate-shaped electrodes 223.

The dust collecting unit 220 generates the electrostatic force by applying different voltages to the first electrode 221 and the second electrode 222 respectively via the first terminal 227 and the second terminal 228. The dust collecting unit 220 collects the particles charged by the charging unit 210 by using the electrostatic force.

The voltage to be applied to the first electrode 221 is high. Specifically, a voltage of 6000 volts is applied to the first electrode 221. The voltage to be applied to the second electrode 222 is low. Specifically, a voltage of zero volts is applied to the second electrode 222. That is, the second electrode 222 is grounded.

In this way, the voltage to be applied to the first electrode 221 of the dust collecting unit 220 is the same as the voltage to be applied to the discharge electrode 211 of the charging unit 210. Therefore, in the present embodiment, the first terminal 227 of the dust collecting unit 220 and the ring-shaped terminal 213 of the charging unit 210 are electrically connected to each other. Specifically, a pair of notches 229 is provided in the first terminal 227 of the dust collecting unit 220. One ring-shaped terminal 213 of the charging unit 210 is hooked to one notch 229. The spring 216 hooked to the other ring-shaped terminal 213 of the charging unit 210 is hooked to the other notch 229. Accordingly, the voltage can be applied to the first electrode 221 of the dust collecting unit 220 and the discharge electrode 211 of the charging unit 210 from a common power supply.

Also, the voltage to be applied to the second electrode 222 of the dust collecting unit 220 is the same as the voltage to be applied to the counter electrode 212 of the charging unit 210. Therefore, in the present embodiment, the second electrode 222 of the dust collecting unit 220 and the counter electrode 212 of the charging unit 210 are integrally molded. That is, the second terminal 228 of the dust collecting unit 220 is used as a terminal to apply the voltage to the counter electrode 212 of the charging unit 210. Accordingly, the voltage can be applied to the second electrode 222 of the dust collecting unit 220 and the counter electrode 212 of the charging unit 210 from the common power supply. Also, the number of components can be reduced. The second electrode 222 of the dust collecting unit 220 and the counter electrode 212 of the charging unit 210 may be individually formed. In this case, the second electrode 222 of the dust collecting unit 220 and the counter electrode 212 of the charging unit 210 may be electrically connected to each other, and the power may be individually supplied to the second electrode 222 and the counter electrode 212.

The first electrode 221 is formed of an antistatic resin having electric conductivity and a resistance value equal to or less than $10^{11}$ $\Omega/cm^2$. The second electrode 222 is formed by plating metal to the resin. The second electrode 222 may be formed of a metal plate such as stainless and may be formed of conductive resin having the resistance value equal to or less than $10^3$ $\Omega/cm^2$ and including carbon. The first terminal 227 attached to the first electrode 221 and the second terminal 228 attached to the second electrode 222 are formed of metal. Also, the ring-shaped terminal 213, the wire 215, and the spring 216 of the discharge electrode 211 are formed of metal. The tube 214 of the discharge electrode 211 has a double-layer structure including an outer layer formed of resin and an inner layer which is adhesive.

In the present embodiment, the first terminal 227 extends in a range from one end of the first electrode 221 in the first direction D1 to both ends of the first electrode 221 in the third direction D3. That is, the first terminal 227 does not protrude from the both sides of the first electrode 221 in the third direction D3. Similarly, the second terminal 228 extends in a range from one end of the second electrode 222 in the first direction D1 to both ends of the second electrode 222 in the third direction D3. That is, the second terminal 228 does not protrude from the both sides of the second electrode 222 in the third direction D3. Therefore, the size of the air cleaner 200 in the third direction D3 can be reduced.

The first terminal 227 is attached to a first feeding unit 273 provided at one end of the first electrode 221 in the first direction D1. The first feeding unit 273 extends outward in the first direction D1 from a position separated from the sides of the first electrode 221 on both ends in the third direction D3 on one end surface of the first electrode 221 in the first direction D1. In the present embodiment, a right end surface of the first electrode 221 has a rectangular shape formed of two long sides and two short sides, and the two short sides correspond to the sides on the both ends in the third direction D3. That is, in the present embodiment, the first feeding unit 273 extends to the right side from a position other than the short sides on the right end surface of the first electrode 221. Therefore, the voltage to be applied via the first terminal 227 is applied to the right end surface of the first electrode 221 from the position separated from the short sides on the right end surface of the first electrode 221 not the short sides of the right end surface of the first electrode 221. Therefore, a difference between the voltages applied to the front and rear sides of the first electrode 221 can be reduced. That is, a distribution of the potential of the first electrode 221 in the third direction D3 can be made closer to being even.

The second terminal 228 is attached to a second feeding unit 274 provided at one end of the second electrode 222 in the first direction D1. The one end of the first electrode 221 in the first direction D1 where the first feeding unit 273 is provided is positioned outer in the first direction D1 than the one end of the second electrode 222 in the first direction D1. The second feeding unit 274 extends outward in the first direction D1 from one end surface of the second electrode 222 in the first direction D1 and goes through a position separated in the second direction D2 from the one end of the first electrode 221 in the first direction D1. In the present embodiment, the right end which is the one end of the first electrode 221 in the first direction D1 is formed of the right end of the first connection member 225. Also, the right end which is the one end of the second electrode 222 in the first direction D1 is formed of the second plate-shaped electrode 224 on the most right side, the right end of the second connection member 226, and the right end of the counter electrode 212. A gap 275 is formed between the right end of the first connection member 225 and the first plate-shaped electrode 223 on the most right side. The second plate-shaped electrode 224 on the most right side is inserted into the gap 275 so that the right end of the first connection member 225 is placed on the right side of the second plate-shaped electrode 224 on the most right side. That is, the right end of the first electrode 221 is placed outer than the right end of the second electrode 222 in the horizontal direction of the air cleaner 200. The second feeding unit 274 extends to the right side from at least one of the plate face of the second plate-shaped electrode 224 on the most right side and the right end surface of the second connection member 226 and passes above the right end of the first connection member 225. That is, in the present embodiment, the second feeding unit 274 extends outward from the right end surface of the second electrode 222 in the horizontal direction of the air cleaner 200 and goes through the position separated from the right end of the first electrode 221 in the vertical direction of the air cleaner 200. Therefore, the first terminal 227 is not connected to the front surface of the first electrode 221, and the second terminal 228 is not connected to the front surface of the second electrode 222. The first terminal 227 can be connected to the right end surface of the first electrode 221 while connecting the second terminal 228 to the right end surface of the second electrode 222. Therefore, the size of the air cleaner 200 in the third direction D3 can be reduced.

Since the first electrode 221 is formed of antistatic resin, spark does not occur even when the second feeding unit 274 is provided near the right end of the first electrode 221. Therefore, the size of the air cleaner 200 in the second direction D2 can be reduced by employing a structure in which the second feeding unit 274 is provided near the right end of the first electrode 221.

The first terminal 227 includes a first extended part 251, a first curved part 253, a first end 255, a third curved part 257, and a pair of erected parts 258. The first extended part 251 is a part extended from the one end of the first electrode 221 in the first direction D1. The first curved part 253 is a part curved from the first extended part 251 in the third direction D3. The first end 255 is a part extended from the first curved part 253. The first end 255 has a flat plate shape and is arranged to have the thickness in the first direction D1. The first end 255 includes a plate face 271 for power supply. The third curved part 257 is a part curved from the upper end of the first end 255 in the first direction D1. The erected part 258 is a part erected from the third curved part 257. The notch 229 is provided in each erected part 258.

The second terminal 228 includes a second extended part 252, a second curved part 254, and a second end 256. The second extended part 252 is a part extended from the one end of the second electrode 222 in the first direction D1. The second curved part 254 is a part curved from the second extended part 252 in the second direction D2. The second end 256 is a part extended from the second curved part 254. The second end 256 has a flat plate shape and is arranged to have the thickness in the first direction D1. The second end 256 includes a plate face 272 for power supply. The second end 256 is arranged with an interval with the first end 255 in the first direction D1. It is preferable that the interval is wide so as not to generate tracking even when water drops enter the air cleaner 200, and specifically, it is preferable that the width of the interval be equal to or more than two cm.

The frame part 230 has an upper frame 231 and a lower frame 232.

As described above, the air cleaner 200 is arranged at a position in front of the heat exchangers 131 and 132 and separated from the heat exchangers 131 and 132. The air vertically flows at this position. Also, as described above, the air cleaner 200 is attached to the indoor unit body 110 in a direction in which the longitudinal direction of the air cleaner 200 becomes horizontal. A direction in which the front and rear surfaces of the upper frame 231 extend and a direction in which the front and rear surfaces of the lower frame 232 extend are the second direction D2. Therefore, when the air cleaner 200 is attached to the indoor unit body 110, both the direction in which the front and rear surfaces of the upper frame 231 extend and the direction in which the front and rear surfaces of the lower frame 232 extend are vertical. That is, when the air cleaner 200 is attached to the indoor unit body 110, the front and rear surfaces of the upper frame 231 and the front and rear surfaces of the lower frame 232 extend along the direction of the air flow. Therefore, an outline of the upper frame 231 and an outline of the lower frame 232 hardly prevent the flow of the air, and the efficiency of the air conditioner is improved. Also, since the rear surface of the upper frame 231 and the rear surface of the lower frame 232 are vertical surfaces, the air cleaner 200 can be compactly housed in front of the heat exchangers 131 and 132. That is, a space deep in the indoor unit body 110 can be effectively used.

A handle 233 is provided on the front surface of the upper frame 231. An opening 234 is provided in the upper surface of the upper frame 231. The prefilter 240 is fitted into the opening 234.

A rib 235 and an opening 236 are provided in the lower surface of the lower frame 232. A slit 237 is provided in the upper surface of the rib 235. In the present embodiment, the slit 237 does not pass through the rib 235 in the second direction D2. That is, the slit 237 is a groove having a bottom surface. At least a part of the opening 236 is divided by the rib 235. In the present embodiment, the opening 236 is completely divided by the rib 235. That is, the rib 235 crosses the opening 236. The cross direction of the rib 235 is the third direction D3. In the present embodiment, the number of ribs 235 is one.

At least a part of any one of the first plate-shaped electrodes 223 is fitted into the slit 237 of the rib 235. The other first plate-shaped electrodes 223 of the first plate-shaped electrodes 223 are exposed on both sides of the rib 235 through the opening 236. In the present embodiment, at least a part of the first plate-shaped electrode 223 at the center of the plurality of first plate-shaped electrodes 223 is fitted into the slit 237 of the rib 235. Specifically, the lower end part of the first plate-shaped electrode 223 at the center is fitted into the slit 237 of the rib 235. Accordingly, the first electrode 221 is positioned.

As described above, in the dust collecting unit 220, the second plate-shaped electrodes 224 are alternately arranged with the intervals from the first plate-shaped electrodes 223. Therefore, the plurality of second plate-shaped electrodes 224 is further exposed on both sides of the rib 235 through the opening 236.

The plate-shaped electrode fitted into the slit 237 of the rib 235 is not limited to the first plate-shaped electrode 223 and may be the second plate-shaped electrode 224.

Also, the number of ribs 235 can be appropriately changed. When the two ribs 235 are provided, at least a part of the two first plate-shaped electrodes 223 may be respectively fitted into the slits 237 of the two ribs 235, and at least a part of the first plate-shaped electrode 223 and at least a part of the second plate-shaped electrode 224 may be respectively fitted into the slits 237 of the two ribs 235. Also, at least a part of the two second plate-shaped electrodes 224 may be respectively fitted into the slits 237 of the two ribs 235.

The slit 237 may pass through in the second direction D2. That is, the slit 237 may be a hole having no bottom surface. When the slit 237 is the groove and the hole, two inner wall surfaces are formed in the slit 237.

When both the inner wall surfaces of the slit 237 are flat, an interval between the inner wall surfaces is needed to be the same as the thickness of the plate-shaped electrode to be inserted or to be wider than the thickness of the plate-shaped electrode to be inserted. When the interval is the same as the thickness of the plate-shaped electrode, the plate-shaped electrode can be fixed by sandwiching the plate-shaped electrode between both the inner wall surfaces.

When the inner wall surface of one slit 237 is flat and the inner wall surface of other slit 237 has a single or plurality of projections, an interval between the inner wall surfaces is needed to be the same as the thickness of the plate-shaped electrode to be inserted or to be wider than the thickness of the plate-shaped electrode to be inserted. When the interval is the same as the thickness of the plate-shaped electrode, the plate-shaped electrode can be fixed by sandwiching the plate-shaped electrode between the one inner wall surface and the projection of the other inner wall surface.

When both the inner wall surfaces of the slit 237 are not flat and both the inner wall surfaces have the single or plurality of projections, an interval between the projections of both the inner wall surfaces is needed to be the same as the thickness of the plate-shaped electrode to be inserted or to be wider than the plate-shaped electrode to be inserted. When the interval is the same as the thickness of the plate-shaped electrode, the plate-shaped electrode can be fixed by sandwiching the plate-shaped electrode between the projections of both the inner wall surfaces.

In the present embodiment, one side surface of the rib 235 has a projection 238. The projection 238 has contact with a side surface of any one of the second plate-shaped electrodes 224. In the present embodiment, the projection 238 on the one side surface of the rib 235 has contact with the side surface of the second plate-shaped electrode 224 on the left side of the first plate-shaped electrode 223 at the center. Accordingly, the second electrode 222 is also positioned.

It is preferable that the projections 238 on the one side surface of the rib 235 be provided at least at two places on the one side surface of the rib 235. In the present embodiment, the projections 238 are provided at two places on the one side surface of the rib 235.

In the present embodiment, similarly to the one side surface of the rib 235, the other side surface of the rib 235 has a projection 239. The projection 239 has contact with the side surface of any other second plate-shaped electrode 224 of the plurality of second plate-shaped electrodes 224. In the present embodiment, the projection 239 on the other side surface of the rib 235 has contact with the side surface of the second plate-shaped electrode 224 on the right of the first plate-shaped electrode 223 at the center. Accordingly, the second electrode 222 is surely positioned.

It is preferable that the projections 239 on the other side surface of the rib 235 be provided at least at two places on the other side surface of the rib 235. In the present embodiment, the projections 239 are provided at two places on the other side surface of the rib 235.

The frame part 230 further includes a middle frame 259.

The middle frame 259 is fitted to the upper surface of the lower frame 232 on a side of one end in the first direction D1. Specifically, the middle frame 259 covers the lower frame 232 so as to cover from the edge of the opening 236 to the end of the lower frame 232 in the first direction D1. Accordingly, the first terminal 227 and the second terminal 228 are covered with the middle frame 259.

A protruding part which is not shown is provided on the lower surface of the middle frame 259. The protruding part seals a space between the first end 255 of the first terminal 227 and the second end 256 of the second terminal 228 arranged in the first direction D1. Accordingly, even when water drops enter the air cleaner 200, the generation of the tracking between the first terminal 227 and the second terminal 228 can be prevented.

In the present embodiment, the lower frame 232 has a first hole 261 and a second hole 262. The first end 255 of the first terminal 227 passes through the first hole 261 in the second direction D2, and the second end 256 of the second terminal 228 passes through the second hole 262 in the second direction D2. The second hole 262 is separated from the first hole 261. As in the description regarding the interval between the first end 255 and the second end 256, it is preferable that the interval between the first hole 261 and the second hole 262 be wide so as not to generate the tracking.

The lower frame 232 further includes a groove 263 which is connected to the first hole 261 and is separated from the second hole 262. The first extended part 251 of the first terminal 227 is fitted into the groove 263. In the present embodiment, the first curved part 253 of the first terminal 227 passes through the first hole 261 together with the first end 255. However, the first curved part 253 may be fitted into the groove 263 together with the first extended part 251.

On the lower surface of the lower frame 232, a first restriction unit 277 which is a partition wall is provided in front of the first hole 261. A second restriction unit 278 which is a partition wall is provided in front of the second hole 262, and the position of the wall surface of the second restriction unit 278 in the third direction D3 is the same as that of the first restriction unit 277. Functions of the first restriction unit 277 and the second restriction unit 278 are described below.

A structure of the filter cleaning device 300 is described with reference to FIGS. 9 to 23.

As described above, the filter cleaning device 300 includes the device body 310 and the dust box 320.

Figure 9:
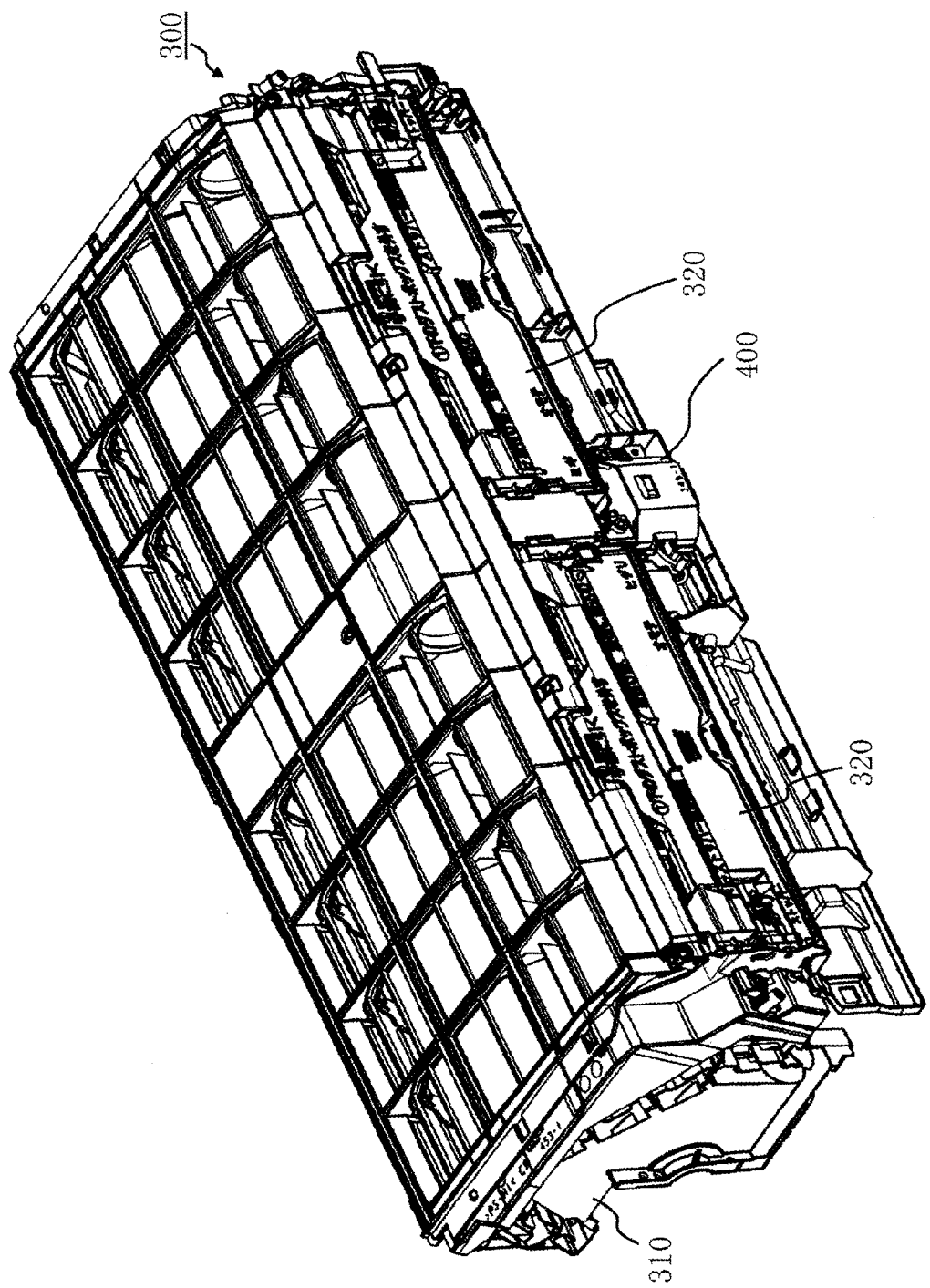
FIG. 9 is a perspective view of a filter cleaning device of the air conditioner according to the first embodiment.

As illustrated in FIG. 9, the power supply unit 400 is fixed in a lower part on the front surface of the device body 310. The power supply unit 400 applies the voltage to generate the electrostatic force to the dust collecting unit 220 of the air cleaner 200.

As described above, in the present embodiment, the indoor unit 100 of the air conditioner further includes the power supply unit 400. The indoor unit body 110 houses the power supply unit 400 in a lower part on the front surface.

Figure 10:
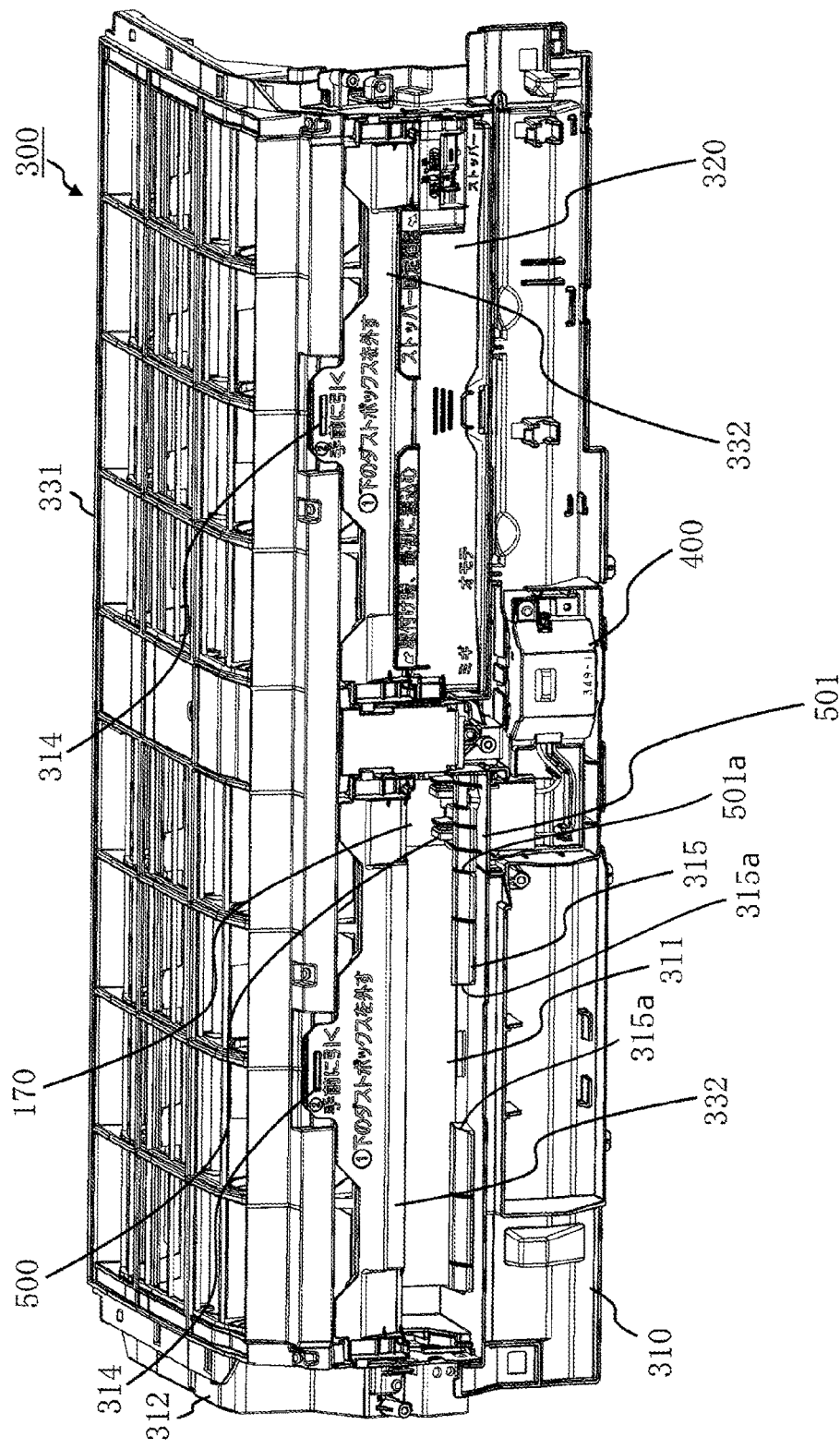
FIG. 10 is a perspective view of the filter cleaning device, of which one dust box is removed, of the air conditioner according to the first embodiment.

FIG. 10 is a diagram of the filter cleaning device 300 of which the dust box 320 on the left side has been removed.

Apart of the device body 310 forms a supporting part 500. The supporting part 500 supports the air cleaner 200.

As described above, in the present embodiment, the indoor unit 100 of the air conditioner further includes the supporting part 500. The indoor unit body 110 houses the supporting part 500 and houses the air cleaner 200 by supporting it by the supporting part 500.

Another part of the device body 310 forms a main receiving part 315. The main receiving part 315 supports the dust box 320.

Still another part of the device body 310 forms the restriction unit 170 which is a partition wall. As described above, the restriction unit 170 restricts a range in which the air cleaner 200 enters the indoor unit body 110 in the depth direction. In the present embodiment, the restriction unit 170 restricts not only the range of the indoor unit body 110 in the depth direction but also a range in which the air cleaner 200 can move in the horizontal direction of the indoor unit body 110. The device body 310 includes a mechanism for restricting the range in which the filter 140 can move in the horizontal direction of the indoor unit body 110. The restriction unit 170 is positioned below the mechanism. It is preferable that the range of the movement of the filter 140 restricted by the mechanism be the same as the range of the movement of the air cleaner 200 restricted by the restriction unit 170. That is, it is preferable that the restriction unit 170 restrict the range in which the air cleaner 200 can move in the horizontal direction of the indoor unit body 110 to be the same as the range in which the filter 140 can move in the horizontal direction of the indoor unit body 110. When the size of the filter 140 in the horizontal direction is the same as that of the air cleaner 200, the air which has passed through the filter 140 can be efficiently flown into the air cleaner 200 by adjusting the positions of the filter 140 and the air cleaner 200 to be the same. Also, a range in which an obstacle exists in the horizontal direction can be reduced by vertically arranging the right end of the mechanism to be the obstacle of wind vertically flown and the right end of the restriction unit 170.

At least a part of the power supply unit 400 is arranged just below the supporting part 500. This can shorten the wiring from the power supply unit 400 to the supporting part 500 to be described. Since the high voltage is applied from the power supply unit 400 to the dust collecting unit 220 of the air cleaner 200, it is necessary to provide wiring by using an expensive cable. Therefore, when the wiring can be shortened, the cost can be reduced. Even when the power supply unit 400 is not arranged below the supporting part 500, the same effect can be obtained in a case where the power supply unit 400 is arranged adjacent to the supporting part 500. Therefore, as in the present embodiment, when the air cleaner 200 is held at the right end of the filter cleaning device 300 on the left side, it is preferable that the power supply unit 400 be arranged adjacent to the right end of the filter cleaning device 300 on the left side. In the present embodiment, the power supply unit 400 is arranged at the center of the indoor unit body 110 in the horizontal direction, and this place corresponds to the place adjacent to the right end of the filter cleaning device 300 on the left side. When the air cleaner 200 is held at the left end of the filter cleaning device 300 on the right side, it is preferable that the power supply unit 400 be arranged adjacent to the left end of the filter cleaning device 300 on the right side. The center of the indoor unit body 110 in the horizontal direction corresponds to the place adjacent to the left end of the filter cleaning device 300 on the right side. When the air cleaner 200 is held at the left end of the filter cleaning device 300 on the left side, it is preferable that the power supply 0.20 unit 400 be arranged adjacent to the left end of the filter cleaning device 300 on the left side. The left end of the indoor unit body 110 corresponds to the place adjacent to the left end of the filter cleaning device 300 on the left side. When the air cleaner 200 is held at the right end of the filter cleaning device 300 on the right side, it is preferable that the power supply unit 400 be arranged adjacent to the right end of the filter cleaning device 300 on the right side. The right end of the indoor unit body 110 corresponds to the place adjacent to the right end of the filter cleaning device 300 on the right side.

As described above, the insertion port 311 is provided in the front surface of the device body 310, and both the air cleaner 200 and the dust box 320 are inserted into the insertion port 311. The supporting part 500 is arranged in a range from the right end of the insertion port 311 to a position deep in the indoor unit body 110 in the depth direction. Specifically, the position deep in the depth direction in the indoor unit body 110 is a position in front of the lower heat exchanger 132. That is, in the present embodiment, the supporting part 500 extends from the front surface of the device body 310 toward the heat exchanger 132 and does not have contact with the heat exchanger 132. Therefore, the supporting part 500 does not damage the heat exchanger 132. Also, the supporting part 500 hardly prevents the flow of the air. In addition, a metal part, which is projected from the supporting part 500, such as the terminal to be described is hardly cooled. A metal part such as the terminal of the air cleaner 200 having contact with the terminal is hardly cooled. Also, the dew condensation water of the heat exchangers 131 and 132 does not flow into the supporting part 500. Therefore, the dew condensation hardly occurs in the supporting part 500 and the air cleaner 200. The supporting part 500 may be arranged in a range from the left end of the insertion port 311 to a position deep in the indoor unit body 110 in the depth direction. In this case, it is preferable that the position of the power supply unit 400 be changed according to the position of the supporting part 500. That is, it is preferable that at least a part of the power supply unit 400 be arranged just below the supporting part 500.

The supporting part 500 includes an auxiliary receiving part 501 next to the main receiving part 315. The auxiliary receiving part 501 supports the dust box 320 together with the main receiving part 315.

The upper surfaces of the main receiving part 315 and the auxiliary receiving part 501 form a wall surface of the lower side of the insertion port 311. The dust box 320 is placed on the wall surface, that is, the upper surfaces of the main receiving part 315 and the auxiliary receiving part 501 so that the dust box 320 is supported. A ridge line 315a of the upper surface of the main receiving part 315 viewed from the side is the same in shape as a ridge line 501a of the upper surface of the auxiliary receiving part 501.

In the present embodiment, the supporting part 500 is manufactured as a component different from the components other than the main receiving part 315 and the device body 310. However, the supporting part 500 may be integrally molded with the main receiving part 315 and may be integrally molded with the other components of the device body 310.

Figure 11:
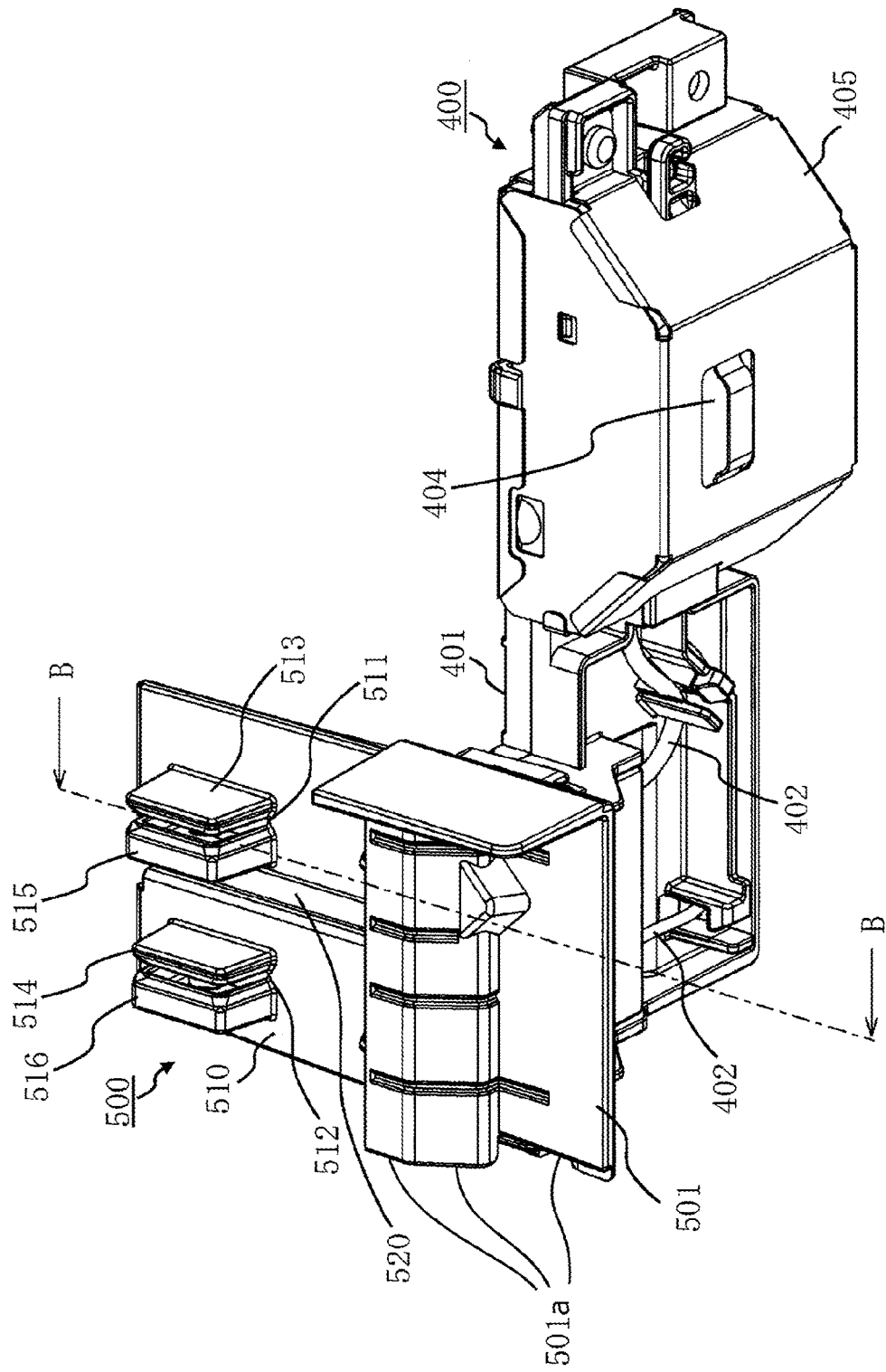
FIG. 11 is a perspective view of a power supply unit and a supporting part of the air conditioner according to the first embodiment.
Figure 12:
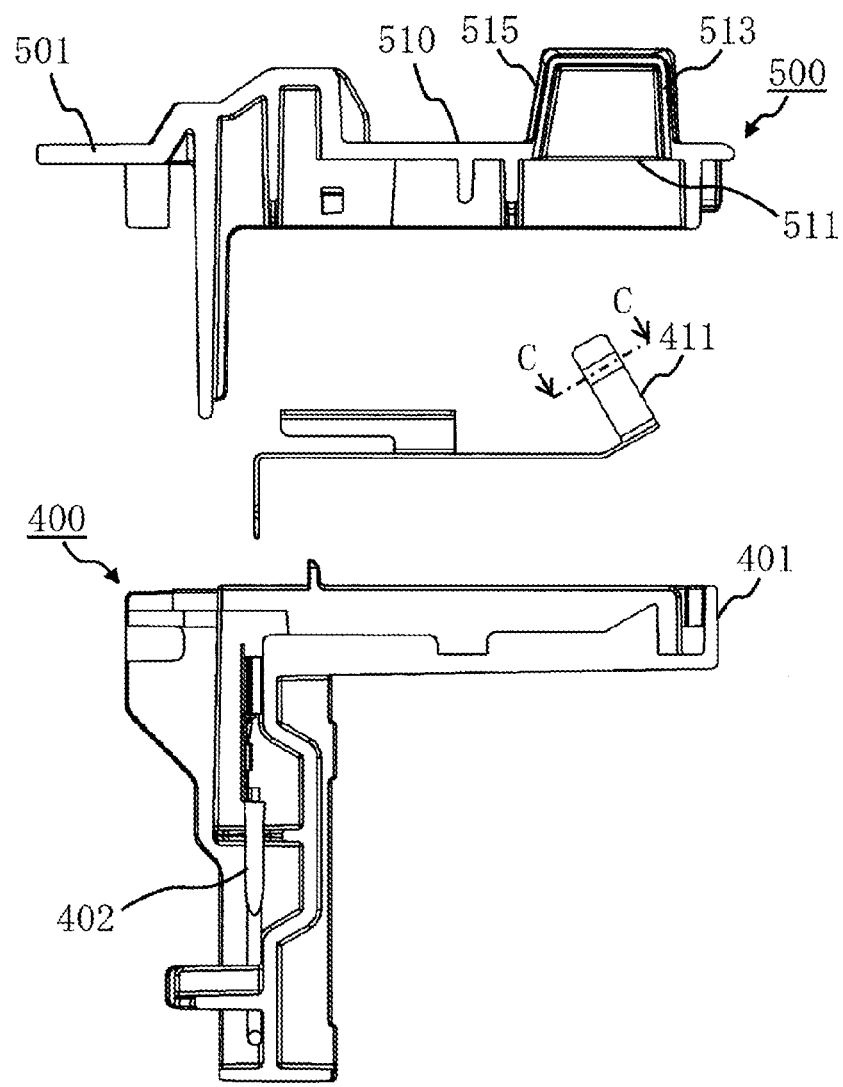
FIG. 12 is a disassembled B-B cross sectional diagram of the power supply unit and the supporting part of the air conditioner according to the first embodiment.
Figure 13:
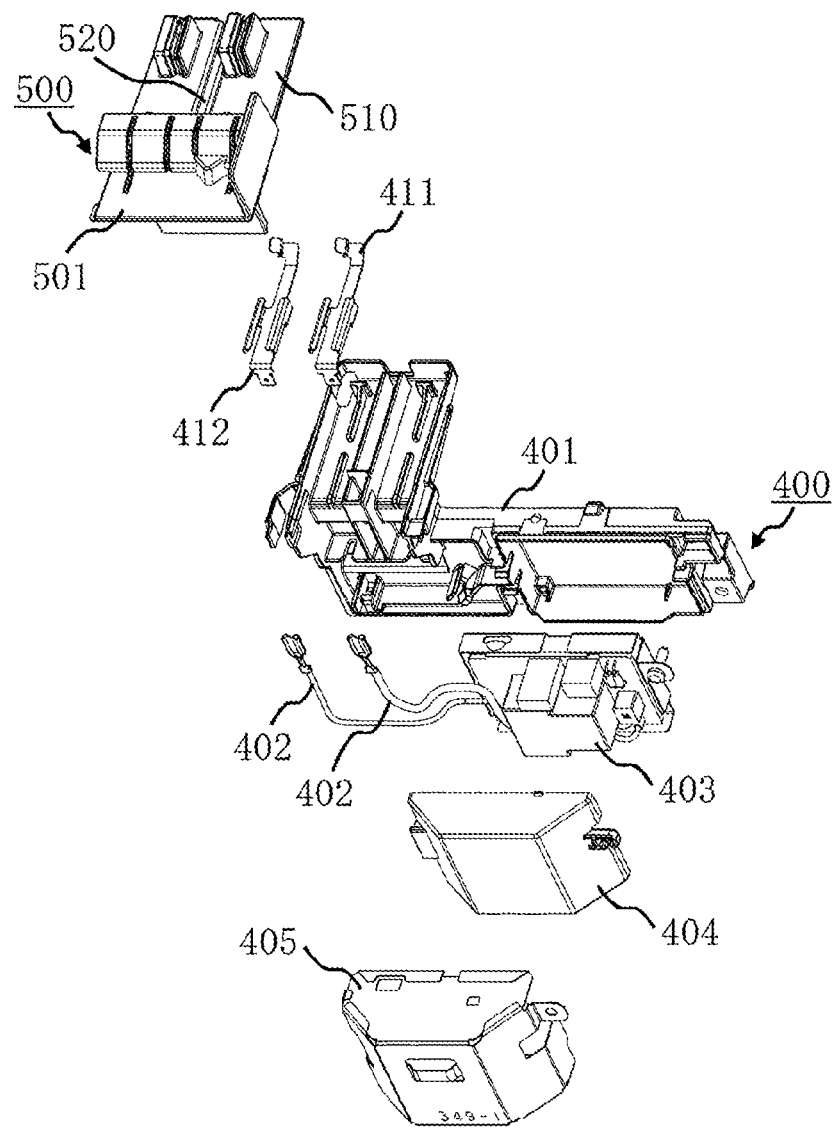
FIG. 13 is a disassembled perspective view of the power supply unit and the supporting part of the air conditioner according to the first embodiment.
Figure 14:
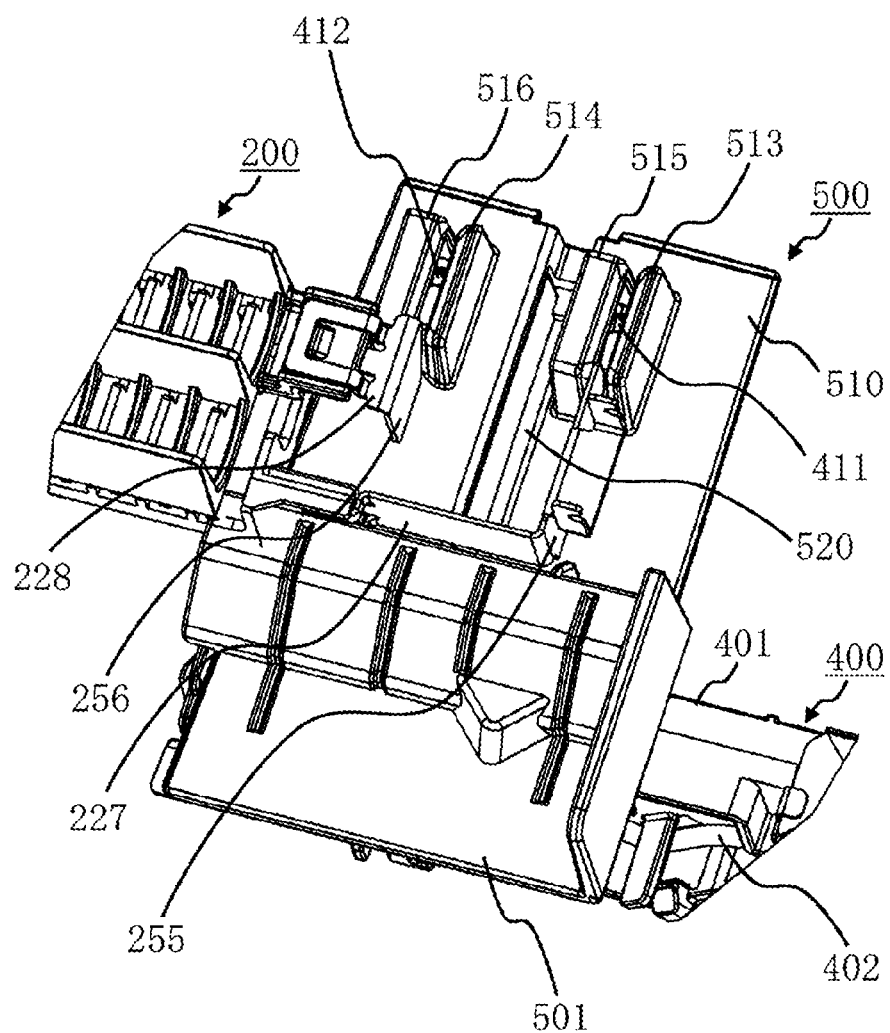
FIG. 14 is a perspective view of terminals just before being electrically connected and a peripheral part, of the air cleaner and the power supply unit of the air conditioner according to the first embodiment.

FIG. 11 is a diagram of the power supply unit 400 and the supporting part 500 which have been removed from the device body 310 of the filter cleaning device 300 viewed obliquely from above and front side. FIG. 12 is a diagram of a cross section where the power supply unit 400 is separated from the supporting part 500 and both of them are cut along a B-B line in FIG. 11. FIG. 13 is a diagram of the disassembled power supply unit 400 and supporting part 500 viewed obliquely from above and front side. FIG. 14 is a diagram of the first terminal 227 and the second terminal 228 immediately before being electrically connected to each other, a third terminal 411 to be described, a fourth terminal 412 to be described, and a peripheral part. In FIG. 14, for convenience of the description, the frame part 230 of the air cleaner 200 is removed so that each terminal can be seen.

The supporting part 500 has an upper surface 510. The upper surface 510 is a surface on which the air cleaner 200 is placed when the air cleaner 200 is housed in the indoor unit body 110. Two holes of a third hole 511 and a fourth hole 512 are provided in the upper surface 510.

The power supply unit 400 includes a fixing frame 401, a converter 403, an insulating frame 404, and a metal cover 405. The third terminal 411 and the fourth terminal 412 are attached to the power supply unit 400 via a pair of electrical wires 402.

The fixing frame 401 fixes the power supply unit 400 to the device body 310 of the filter cleaning device 300. A space to house the third terminal 411 and the fourth terminal 412 is formed above the fixing frame 401, and the supporting part 500 is fitted there so as to cover the space.

The electrical wires 402 electrically connect the converter 403 to the third terminal 411 and the fourth terminal 412.

The converter 403 is attached to the fixing frame 401. The converter 403 converts power supplied from the outside of the indoor unit 100 of the air conditioner into desired DC power via an electrical wire which is not shown. In the present embodiment, the converter 403 converts an AC voltage applied from a commercial power supply into a DC voltage and applies the obtained DC voltage to the first electrode 221 and the second electrode 222 of the air cleaner 200 via the electrical wires 402, the third terminal 411, and the fourth terminal 412.

The insulating frame 404 covers the converter 403.

The metal cover 405 covers the insulating frame 404.

The third terminal 411 and the fourth terminal 412 are respectively projected from the third hole 511 and the fourth hole 512. When the air cleaner 200 is placed on the upper surface 510 of the supporting part 500, the third terminal 411 and the fourth terminal 412 respectively have contact with the first terminal 227 and the second terminal 228 of the air cleaner 200. The power supply unit 400 applies the different voltages to the first terminal 227 and the second terminal 228 respectively via the third terminal 411 and the fourth terminal 412. In the present embodiment, a voltage of 6000 volts is applied to the first terminal 227 via the third terminal 411, and a voltage of zero volts is applied to the second terminal 228 via the fourth terminal 412.

The shapes, sizes, directions, and positions of the third terminal 411 and the fourth terminal 412 can be appropriately changed. However, the shape, size, direction, and position employed in the present embodiment are described below.

It is preferable that a part projected from a hole of the fourth terminal 412 be arranged in the horizontal direction of the indoor unit body 110 with an interval with a part projected from a hole of the third terminal 411. In the present embodiment, the part projected from the fourth hole 512 of the fourth terminal 412 is arranged in the horizontal direction of the indoor unit body 110 with an interval with the part projected from the third hole 511 of the third terminal 411. Therefore, when the air cleaner 200 is attached to the indoor unit body 110, the first terminal 227 and the second terminal 228 have easily contact with the respective third terminal 411 and fourth terminal 412.

Similarly, it is preferable that the fourth hole 512 and the third hole 511 be arranged in the horizontal direction of the indoor unit body 110 with an interval from each other.

As described above, in the present embodiment, the second end 256 of the second terminal 228 is arranged in the horizontal direction of the indoor unit body 110 with an interval with the first end 255 of the first terminal 227. The first end 255 has a flat plate shape and includes a plate face 271. The first end 255 is arranged to have the thickness in the horizontal direction of the indoor unit body 110. The second end 256 has a flat plate shape and includes a plate face 272. The second end 256 is arranged to have the thickness in the horizontal direction of the indoor unit body 110. Since the thickness direction of the second end 256 is the same as that of the first end 255, as illustrated in FIG. 5, the plate face 272 of the second end 256 is parallel to the plate face 271 of the first end 255. The directions in which the plate face 271 of the first end 255 and the plate face 272 of the second end 256 extend are respectively the front-back direction and the vertical direction of the indoor unit body 110. The third terminal 411 and the fourth terminal 412 respectively have contact with the plate face 271 of the first end 255 and the plate face 272 of the second end 256. The directions in which the air cleaner 200 moves in a process to be placed on the supporting part 500 are the front-back direction and the vertical direction of the indoor unit body 110 and are the same as the directions in which the plate faces 271 and 272 extend. Therefore, the air cleaner 200 can be moved while the third terminal 411 and the fourth terminal 412 respectively have contact with the plate faces 271 and 272. Therefore, the air cleaner 200 can be smoothly attached to the indoor unit body 110.

In the present embodiment, the length of the interval between the first end 255 and the second end 256 is adjusted to be the same as that of the interval between the part projected from the third hole 511 of the third terminal 411 and the part projected from the fourth hole 512 of the fourth terminal 412.

It is preferable that the part projected from the hole of the fourth terminal 412 be positioned at the same position as the part projected from the hole of the third terminal 411 in the front-back direction of the indoor unit body 110. In the present embodiment, the part projected from the fourth hole 512 of the fourth terminal 412 is positioned at the same position as the part projected from the third hole 511 of the third terminal 411 in the front-back direction of the indoor unit body 110. Therefore, when the air cleaner 200 is attached to the indoor unit body 110, the first terminal 227 and the second terminal 228 have easily contact with the respective third terminal 411 and the fourth terminal 412.

Similarly, the fourth hole 512 is provided at the same position as the third hole 511 in the front-back direction of the indoor unit body 110.

In the present embodiment, the plate face 272 of the second end 256 is extended to the same position as that of the plate face 271 of the first end 255 in the front-back direction of the indoor unit body 110. Therefore, the third terminal 411 and the fourth terminal 412 have easily and concurrently contact with the plate face 271 of the first end 255 and the plate face 272 of the second end 256.

It is preferable that the first terminal 227 be positioned at one end of the air cleaner 200 in the horizontal direction of the indoor unit body 110. It is preferable that the second terminal 228 be positioned at the same end as the first terminal 227 of the air cleaner 200 in the horizontal direction of the indoor unit body 110. In the present embodiment, both the first terminal 227 and the second terminal 228 are positioned at the right end of the air cleaner 200. Therefore, the interval between the first end 255 and the second end 256 can be narrowed. The interval between the part projected from the third hole 511 of the third terminal 411 and the part projected from the fourth hole 512 of the fourth terminal 412 can be also narrowed. Therefore, the third terminal 411 and the fourth terminal 412 have easily and concurrently contact with the plate face 271 of the first end 255 and the plate face 272 of the second end 256.

It is preferable that at least one of the third terminal 411 and the fourth terminal 412 be obliquely projected from the hole of the upper surface 510 to the upper surface 510. In the present embodiment, the third terminal 411 and the fourth terminal 412 are obliquely projected from the respective third hole 511 and fourth hole 512 to the upper surface 510. Specifically, the third terminal 411 and the fourth terminal 412 are inclined so as to be gradually projected forward from the lower end to the upper end. Accordingly, when the air cleaner 200 is inserted into the indoor unit body 110, the first terminal 227 and the second terminal 228 have easily and respectively contact with the third terminal 411 and the fourth terminal 412. Especially, in the present embodiment, the first end 255 of the first terminal 227, the second end 256 of the second terminal 228, the third terminal 411, and the fourth terminal 412 have the flat plate shapes. Therefore, when the third terminal 411 and the fourth terminal 412 are inclined, the terminals do not have contact with each other at the point and have contact with each other along the line. In consideration of the thickness of each terminal, the terminals are not brought into line contact with each other and are brought into the surface contact with each other. Therefore, an effect that the air cleaner 200 can be smoothly inserted can be obtained.

On the upper surface 510 of the supporting part 500, two walls, i.e., a first wall 513 and a second wall 514, are provided. The first wall 513 and the second wall 514 are respectively erected from the edge of the third hole 511 and the edge of the fourth hole 512. Specifically, the first wall 513 and the second wall 514 are respectively erected from the right edge of the third hole 511 and the right edge of the fourth hole 512.

When the first terminal 227 is inserted between the third terminal 411 and the first wall 513, the upper end of the third terminal 411 is elastically deformed in the direction to be separated from the first wall 513. The first terminal 227 is sandwiched between the third terminal 411 and the first wall 513 so as to have contact with the third terminal 411. Accordingly, the first electrode 221 of the air cleaner 200 is electrically connected to the power supply unit 400. Similarly, when the second terminal 228 is inserted between the fourth terminal 412 and the second wall 514, the upper end of the fourth terminal 412 is elastically deformed in the direction to be separated from the second wall 514. The second terminal 228 is sandwiched between the fourth terminal 412 and the second wall 514 so as to have contact with the fourth terminal 412. Accordingly, the second electrode 222 of the air cleaner 200 is electrically connected to the power supply unit 400.

At least one of the third terminal 411 and the fourth terminal 412 is gradually projected from the hole of the upper surface 510 to the wall, is bent in the middle, and is extended to the tip end as gradually separating from the wall. In the present embodiment, the third terminal 411 is projected as gradually moving from the third hole 511 to the first wall 513, is bent along the line C-C in FIG. 12, and is extended to the tip end as gradually separating from the first wall 513. When the first terminal 227 is inserted between the third terminal 411 and the first wall 513, the bent part of the third terminal 411 is pressed by the first terminal 227 so that the upper end of the third terminal 411 is elastically deformed. The fourth terminal 412 has the same shape as the third terminal 411. The surface of the first terminal 227 for pressing against the bent part of the third terminal 411 is the plate face 271 of the first end 255. The surface of the second terminal 228 for pressing against the bent part of the fourth terminal 412 is the plate face 272 of the second end 256.

On the upper surface 510 of the supporting part 500, two walls, i.e., a third wall 515 and a fourth wall 516, are provided. The third wall 515 and the fourth wall 516 are respectively erected from the edge opposite from that of the first wall 513 of the third hole 511 and the edge opposite from that of the second wall 514 of the fourth hole 512. Specifically, the third wall 515 and the fourth wall 516 are respectively erected from the left edge of the third hole 511 and the left edge of the fourth hole 512. A hollow part is provided in the third wall 515. The hollow part stores the upper end of the third terminal 411 when the upper end of the third terminal 411 is pressed by the first terminal 227 and is elastically deformed. Similarly, a hollow part is provided in the fourth wall 516. The hollow part stores the upper end of the fourth terminal 412 when the upper end of the fourth terminal 412 is pressed by the second terminal 228 and is elastically deformed.

In addition, a slit 520 is provided in the supporting part 500. The slit 520 passes through between the third hole 511 and the fourth hole 512 in the vertical direction of the indoor unit body 110. Therefore, even when the water is dropped to the upper surface 510, the water is not accumulated.

In the present embodiment, regarding the holes in the upper surface 510, the third hole 511 where the third terminal 411 is projected and the fourth hole 512 where the fourth terminal 412 is projected are individually provided. However, a single hole where both the third terminal 411 and the fourth terminal 412 are projected may be provided.

Also, in the present embodiment, regarding the walls of the upper surface 510, the first wall 513 erected from the edge of the third hole 511 and the second wall 514 erected from the edge of the fourth hole 512 are individually provided. However, a single wall which is erected along the whole region from the edge of the third hole 511 to the edge of the fourth hole 512 or erected from the edge of the single hole may be provided.

As illustrated in FIG. 4, the first restriction unit 277 and the second restriction unit 278 are provided on the lower frame 232 of the air cleaner 200. When the air cleaner 200 is placed on the upper surface 510 of the supporting part 500 or when the air cleaner 200 is moved in the depth direction of the indoor unit body 110, the first restriction unit 277 has contact with the third wall 515. Accordingly, a range in which the air cleaner 200 can be moved in the depth direction of the indoor unit body 110 is restricted, and the contact between the air cleaner 200 and the heat exchangers 131 and 132 is prevented. Similarly, when the air cleaner 200 is placed on the upper surface 510 of the supporting part 500 or when the air cleaner 200 is moved in the depth direction of the indoor unit body 110, the second restriction unit 278 has contact with the second wall 514 and the fourth wall 516. Accordingly, a range in which the air cleaner 200 can be moved in the depth direction of the indoor unit body 110 is restricted, and the contact between the air cleaner 200 and the heat exchangers 131 and 132 is prevented.

Figure 15:
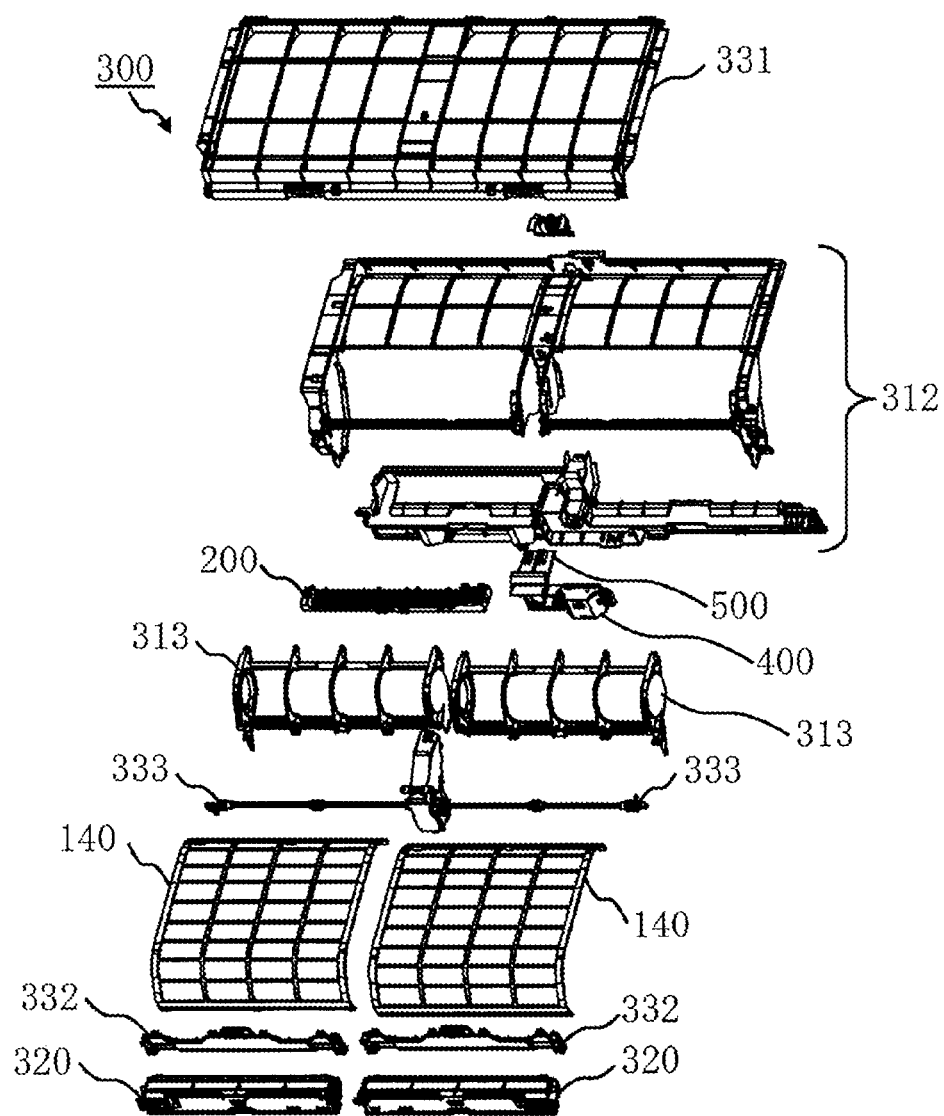
FIG. 15 is a disassembled perspective view of the filter cleaning device of the air conditioner according to the first embodiment.

As illustrated in FIGS. 10 and 15, the filter cleaning device 300 includes a filter conveying guide 312, a filter housing guide 313, a filter conveying cover 331, and a front filter guide 332.

The filter conveying guide 312 and the filter housing guide 313 form the device body 310. The filter housing guide 313 and the filter conveying cover 331 are arranged in the filter conveying guide 312. The front filter guide 332 is arranged in the filter conveying guide 312. The dust box 320 is also provided in the filter conveying guide 312.

The filter conveying guide 312 includes a pair of conveying guide side plates opposed to each other, conveying guide vertical bars extended from the conveying guide side plates on the same plane, conveying guide horizontal bars for connecting the conveying guide side plates to each other and the conveying guide vertical bars to each other, and a conveying guide reinforcing bar for connecting the parts of the conveying guide horizontal bars to each other.

A filter driving shaft of which both ends are rotatably supported is provided in a pair of the conveying guide side plates of the filter conveying guide 312 opposed to each other. A driving motor for rotatably driving the filter driving shaft is provided on the conveying guide side plate where the filter driving shaft is not provided. A conveyance gear 333 engaged with a filter driven rack formed in the filter 140 is placed on the filter driving shaft.

On the opposed surface of the conveying guide vertical bar of the filter conveying guide 312, a conveying guide vertical flange to form a conveying guide groove to which the side edge of the filter 140 can enter is provided.

The filter conveying cover 331 is a frame body arranged in the air trunk. The filter conveying cover 331 includes a pair of conveying cover vertical girders, conveying cover horizontal girders for connecting the conveying cover vertical girders to each other, and a conveying cover reinforcing girder for connecting the conveying cover horizontal girders to each other.

On the opposed surface of the conveying cover vertical girder of the filter conveying cover 331, a conveying cover vertical flange to form the conveying guide groove to which the side edge of the filter 140 can enter is provided.

The conveying cover vertical girder of the filter conveying cover 331 is joined to the conveying guide vertical bar of the filter conveying guide 312. Accurately, the conveying cover vertical girder on the left side is joined to the conveying guide vertical bar of the left side of the filter conveying guide 312 on the left side. The conveying cover vertical girder on the right side is joined to the conveying guide vertical bar on the right side of the filter conveying guide 312 on the right side. At this time, the conveying cover vertical flanges are opposed to each other with a predetermined interval, and the conveying guide groove to which the side edge of the filter 140 can enter is formed in the interval. The interval to which the filter 140 can enter is formed between the conveying cover reinforcing girder and the conveying guide reinforcing bar. Therefore, the conveying cover reinforcing girder and the conveying guide reinforcing bar form a guide unit corresponding to the conveying guide groove.

The filter housing guide 313 includes a pair of housing guide side plates opposed to each other, housing guide notches which are formed in a part of the housing guide side plates and to which a filter driving shaft enters, housing guide horizontal bars for connecting the housing guide side plates to each other, and housing guide reinforcing bars for connecting parts of the housing guide horizontal bars to each other.

On the opposed surface of the housing guide side plate of the filter housing guide 313, a housing guide groove to which the side edge of the filter 140 can enter is formed. The housing guide groove has a substantially spiral shape and includes a linear part of which one end is close to the housing guide notch and a substantially arc-shaped part of one and half winding continuously connected to the linear part.

The filter 140 includes a rectangular filter ventilation body and the filter frame body. The filter ventilation body has a net-like shape. On the rear surface of the pair of filter vertical bars for forming the outline of the filter 140, that is, the surface on which the filter ventilation body is not provided, the filter driven rack which is an uneven pattern is formed at equal intervals in the longitudinal direction, that is, the vertical direction. The uneven pattern is not limited to an accurate tooth shape.

An operation for moving the filter 140 is described below.

The filter conveying guide 312 is arranged along the suction port 111 of the upper surface in a part closer to the upper surface of the front side of the indoor unit body 110. The filter housing guide 313 is provided on the conveying guide side plate of the filter conveying guide 312, and the housing guide notch of the filter housing guide 313 is positioned on the front side of the filter housing guide 313. The housing guide groove is positioned on the rear side, that is, the position on the side of the heat exchanger 131. In addition, the filter conveying cover 331 is placed on the conveying guide vertical bar of the filter conveying guide 312.

Therefore, almost all the range of the filter 140 is rewound and expanded in a state where the side edge of the filter 140 enters the conveying guide groove which is a gap between the conveying guide vertical flange of the filter conveying guide 312 and the conveying cover vertical flange of the filter conveying cover 331. At this time, a front tip end which is one end of the filter 140 has a substantially arc shape with a small curvature radius when viewed from the side in a state where the front tip end is sandwiched between the upper surface of the dust box 320 and the conveyance gear 333.

When the conveyance gear 333 is rotated in a positive direction, both side edges of the filter 140 are fed out toward the housing guide groove. The front tip end of the filter 140 is guided by the linear part of the housing guide groove and is moved in a substantially linear form first. When reaching the substantially arc-shaped part of the housing guide groove, the front tip end is moved in a spiral shape. When the rear end which is another end of the filter 140 moves closer to the conveyance gear 333, most part of the filter 140 is wound in a substantially spiral shape of about one and half winding. During the movement, regarding the filter ventilation body of the filter 140, a dust removing brush of the dust box 320 has contact with the surface on the windward side of the air trunk, and the dusts are removed.

On the other hand, when the conveyance gear 333 is rotated in a negative direction, the filter 140 is rewound, and both side edges of the filter 140 are fed out to the conveying guide groove. When the filter 140 covers the entire air trunk, the rotation of the conveyance gear 333 is stopped. At this time, a part of the filter driven rack of the filter 140 is engaged with the conveyance gear 333.

As described above, the device body 310 houses the filter 140 for capturing the dust in the air in a movable form. However, the filter 140 not only moves in the filter cleaning device 300 but also can be removed to the outside of the filter cleaning device 300.

As illustrated in FIGS. 9 and 10, the front filter guide 332 is openably/closably attached to the front surface of the device body 310.

An opening part to take out the filter 140 is formed on the front surface of the filter conveying guide 312. The front filter guide 332 covers the opening part and guides the movement of the filter 140 in a closed state.

A rotation shaft of the front filter guide 332 to open/close the front filter guide 332 is formed at the position below the opening part of the filter conveying guide 312. On the other hand, a fixing part 314 to fix the end apart from the rotation center of the front filter guide 332 in the closed state of the front filter guide 332 is provided at the position above the opening part of the filter conveying cover 331. Therefore, in the closed state of the front filter guide 332, not only the end closer to the rotation center of the front filter guide 332 but also the end apart from the rotation center of the front filter guide 332 is fixed to the device body 310. Therefore, according to the present embodiment, the front filter guide 332 can be surely fixed.

The front filter guide 332 is hung down by its self-weight in an opened state. Therefore, according to the present embodiment, it is not necessary for the user of the air conditioner to support the front filter guide 332 by hand in order to maintain the opened state of the front filter guide 332, and it is not necessary to fix the front filter guide 332 with some fixing mechanisms.

The front filter guide 332 is a movable member positioned between the front panel 150 attached to the indoor unit body 110 and the filter 140. The front filter guide 332 includes a guide unit having contact with the filter 140 at the time of the movement, and the guide unit is a conveyance path of the filter 140. The front filter guide 332 can be opened so that the user of the air conditioner can easily take out the filter 140.

The front filter guide 332 and the dust box 320 are not integrated and separately formed. The front filter guide 332 after being rotated and moved is arranged in a space obtained by removing the dust box 320, that is, a space where the dust box 320 has been originally placed. By separately providing the front filter guide 332 above the dust box 320, both of them can be efficiently housed. Also, when the front filter guide 332 is rotated, a rotation locus can be secured without interfering with other member.

In this way, in the present embodiment, the dust box 320 where the dusts captured by the filter 140 are accumulated is removably attached to the front surface of the filter conveying guide 312 separately from the front filter guide 332. Therefore, it is preferable that the user of the air conditioner remove only the dust box 320 when the dusts accumulated in the dust box 320 are thrown away. It is not necessary to remove the front filter guide 332. It is preferable that the front filter guide 332 be not easily removed.

In the present embodiment, the user can easily take out the filter 140 by using both hands without a special fixing mechanism by hanging down the front filter guide 332 and exposing the filter 140.

Figure 16:
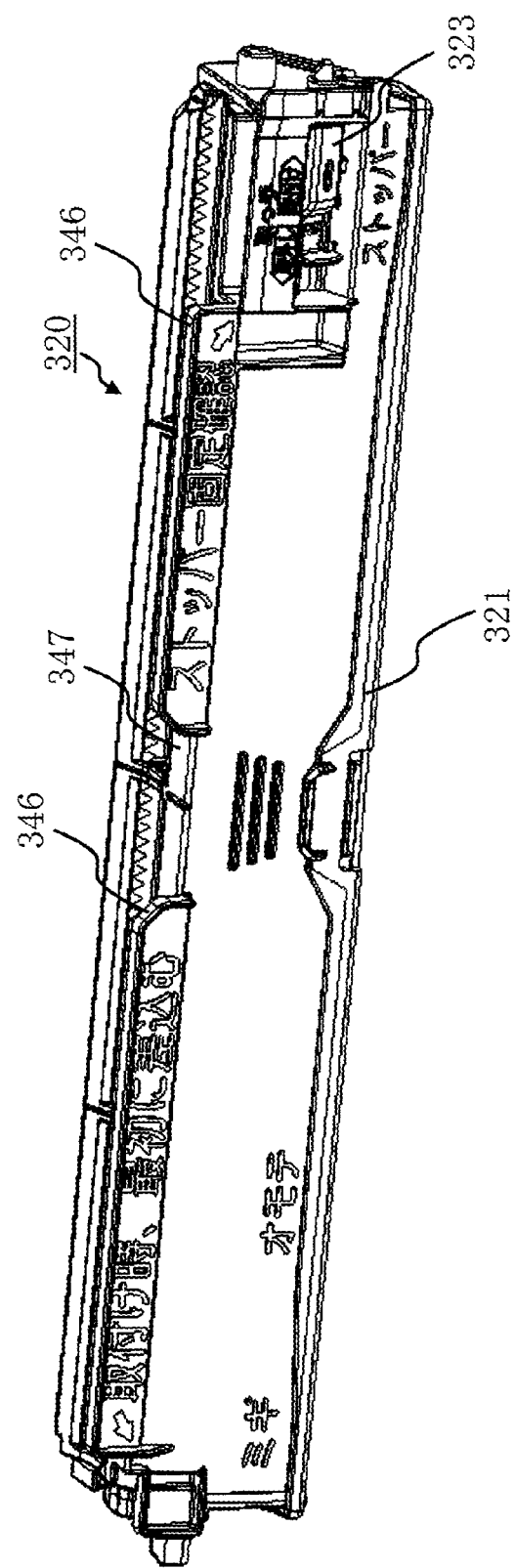
FIG. 16 is a perspective view of the dust box of the filter cleaning device of the air conditioner according to the first embodiment.
Figure 17:
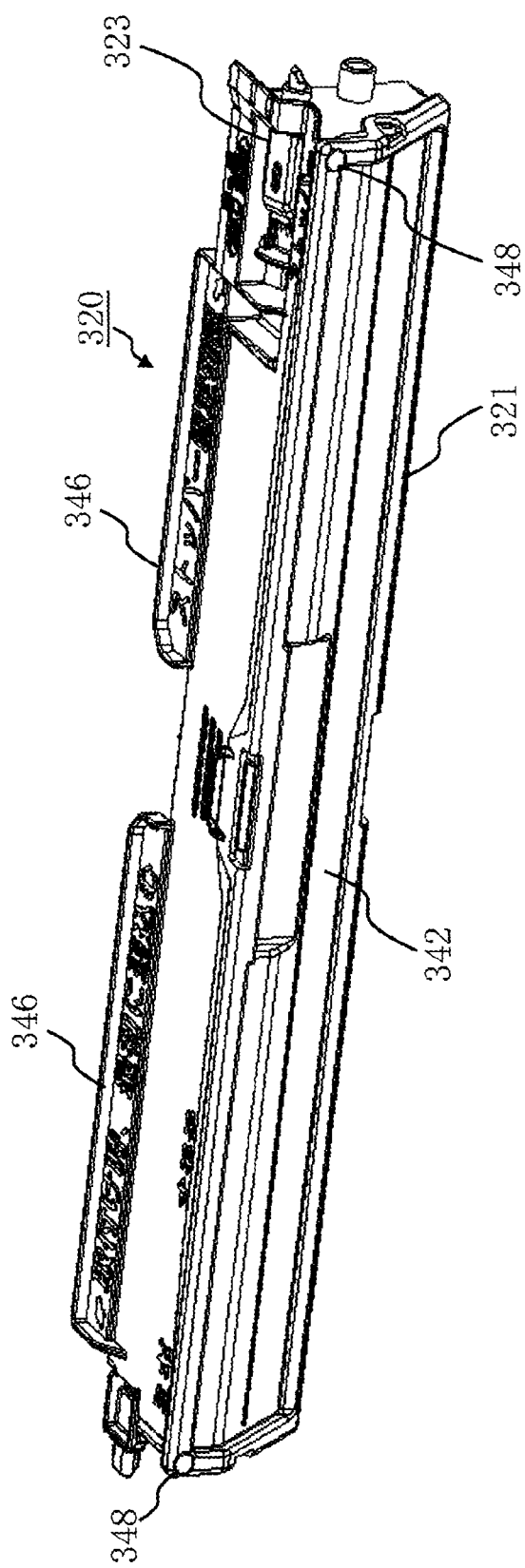
FIG. 17 is a perspective view of the dust box of the filter cleaning device of the air conditioner according to the first embodiment.
Figure 18:
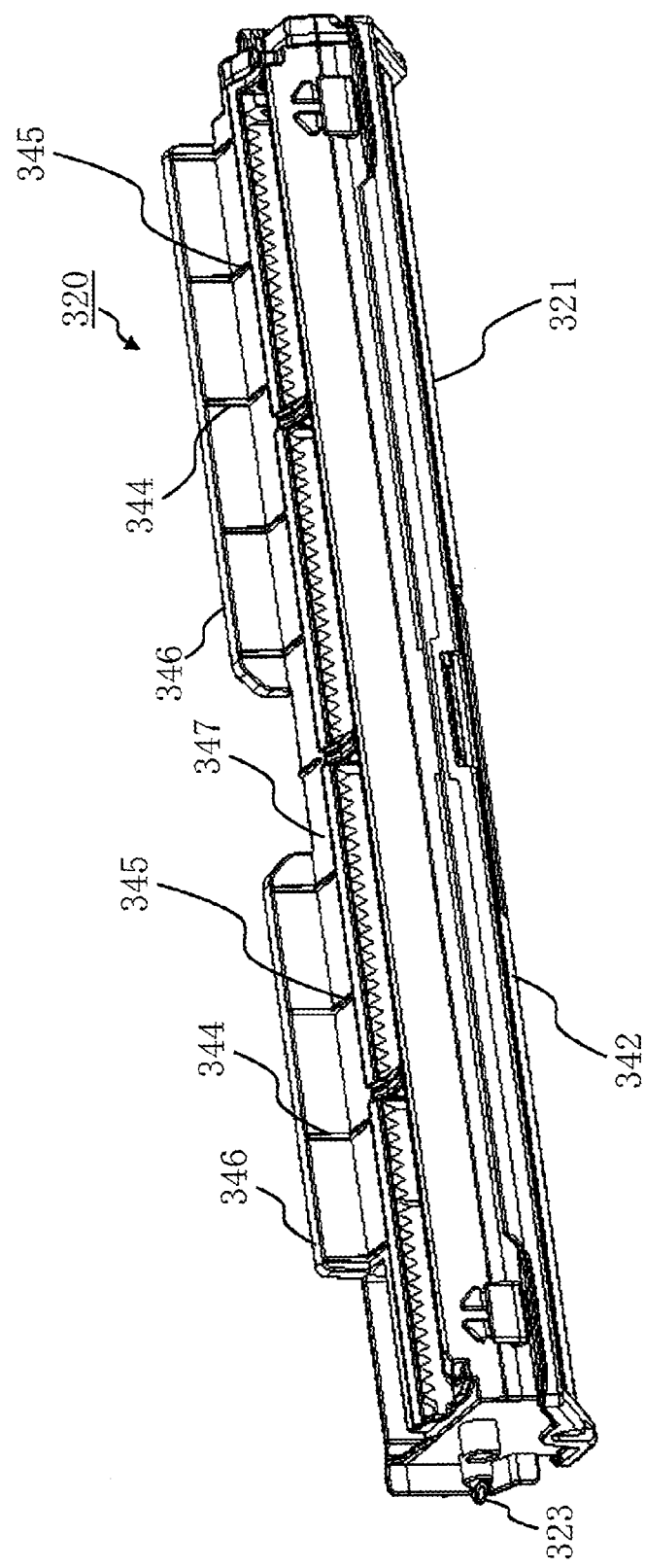
FIG. 18 is a perspective view of the dust box of the filter cleaning device of the air conditioner according to the first embodiment.
Figure 19:
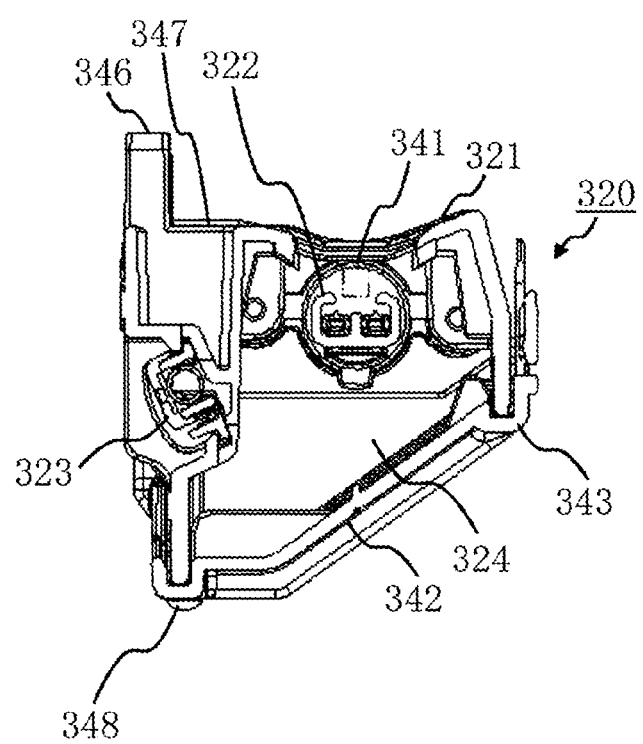
FIG. 19 is a cross sectional diagram of the dust box of the filter cleaning device of the air conditioner according to the first embodiment.
Figure 20:
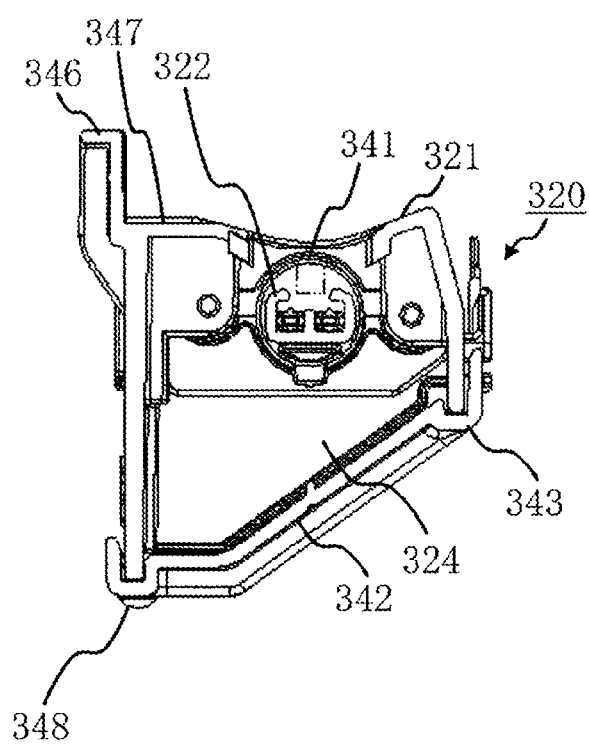
FIG. 20 is a cross sectional diagram of the dust box of the filter cleaning device of the air conditioner according to the first embodiment.
Figure 21:
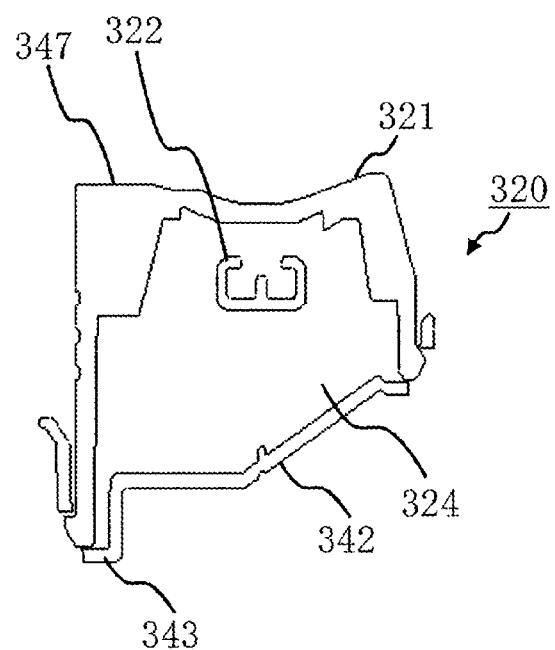
FIG. 21 is a cross sectional diagram of the dust box of the filter cleaning device of the air conditioner according to the first embodiment.
Figure 22:
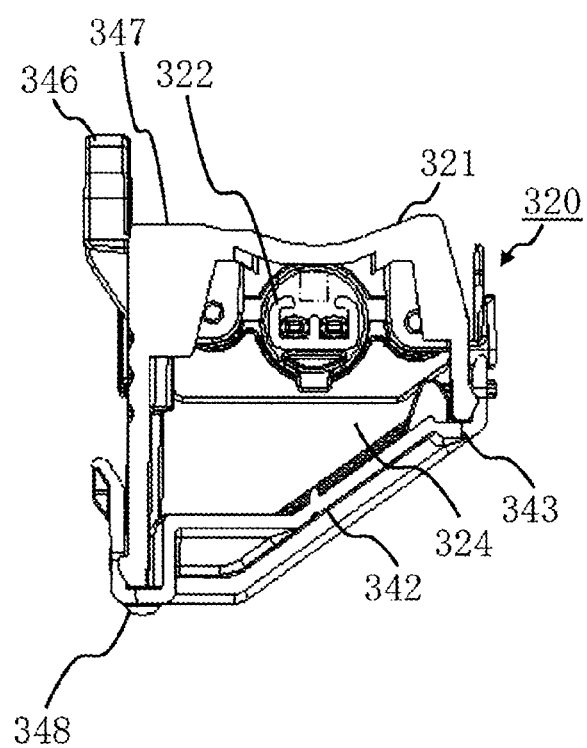
FIG. 22 is a cross sectional diagram of the dust box of the filter cleaning device of the air conditioner according to the first embodiment.

FIG. 16 is a diagram of the dust box 320 viewed obliquely from above and front side. FIG. 17 is a diagram of the dust box 320 viewed obliquely from below and front side. FIG. 18 is a diagram of the dust box 320 viewed obliquely from above and rear side. FIGS. 19 to 22 are diagrams of different cross sections of the dust box 320. FIG. 23 is a diagram of the lower part of the dust box 320 cut for description.

The dust box 320 includes wall plates 321 assembled in a box-like shape, a dust removing shaft 322 of which both ends are supported by both wall plates 321 in a freely swingable manner, and a stopper member 323 attached to the wall plate 321 on the front side.

The wall plates 321 forms a dust collecting chamber 324 which is a space for accumulating the dusts. A dust removing brush which is not shown is attached to the dust removing shaft 322. When being viewed from the upper side, the center of the wall plate 321 on the upper side is opened to the width direction. When being viewed from the side, at the substantially center of the wall plate 321, a brush hole 341 is formed. The tip end of the dust removing brush passes through the brush hole 341. In a state where the dust box 320 is attached to the filter conveying guide 312, the dust removing brush swings when the dust removing shaft 322 swings. Therefore, in a state where the filter 140 has contact with the dust removing brush, the dust removing brush swings so that the dust adhered to the filter 140 is scraped off. The dust which has been scraped off is fallen down to the dust collecting chamber 324 and is accumulated. At this time, since the filter 140 is moved, the dusts on the wide range of the filter 140 can be removed.

The lower part of the wall plate 321 is inclined, and the wall plate 321 on the rear side forms an inclined face part 342. The inclined face part 342 and the wall plate 321 on the lower side form a lid 343 of the dust collecting chamber 324.

In a state where the dust box 320 is attached to the filter conveying guide 312, the dust box 320 is fixed by a spring force of the stopper member 323 so as not to get out. The user of the air conditioner can remove the dust box 320 by sliding the stopper member 323. The user of the air conditioner can throw away the dusts accumulated in the dust collecting chamber 324 by opening the lid 343.

In the present embodiment, in order to surely fix the front filter guide 332 and surely convey the filter 140, the front filter guide 332 and the dust box 320 are separately formed, and fixing parts 344 and 345 to press and fix the front filter guide 332 by contacting the front filter guide 332 are provided in the dust box 320.

When the dust box 320 is attached, in a state where the front filter guide 332 is fixed to the device body 310, the dust box 320 is attached after that. In order to improve a space efficiency, the rotation locus of the front filter guide 332 uses a space where the dust box 320 is attached. Therefore, the front filter guide 332 can rotate and move when the dust box 320 is removed. Also, the dust box 320 can be attached when the front filter guide 332 is returned to the original attached position from the moved state. Therefore, the front filter guide 332 is in the closed state and the dust box 320 is attached after that so that the fixing parts 344 and 345 can press and fix the front filter guide 332.

The front filter guide 332 is pressed by the fixing part 344 included in the dust box 320 from the front side to the rear side. The fixing part 344 is provided on the rear side of the dust box 320 and the side opposed to the front filter guide 332. A projecting part 346 is included in the upper part of the dust box 320. The fixing part 344 may be the rear surface of the projecting part 346. However, in the present embodiment, the fixing part 344 is a rib provided on the rear surface of the projecting part 346 and presses and fixes the front filter guide 332 by contacting the front filter guide 332. Therefore, the fixing part 344 has contact with the front filter guide 332 from the front side and a force is applied to the rear side by attaching the dust box 320, and then the front filter guide 332 can be fixed.

By fixing the front filter guide 332 with the fixing part 344 included in the projecting part 346 projected upward the dust box 320, the front filter guide 332 is fixed in the width direction. Therefore, a case does not occur where both sides of the front filter guide 332 are fixed and the center part is not firmly fixed and the center part is slightly moved in the front-back direction. Therefore, a malfunction does not occur in which the filter 140 is not firmly engaged with the conveyance gear 333 and the filter 140 is removed from the conveyance gear 333.

Both sides of the dust box 320 are fixed to the filer conveying guide 312. In this state, an opposed part 347 which is a top face of the dust box 320 other than the projecting part 346 enters under the front filter guide 332 and is opposed to the front filter guide 332. An angle between the opposed part 347 and the projecting part 346 is about 90°. That is, the opposed part 347 and the projecting part 346 are formed in an L-shape in a side view. The opposed part 347 has contact with the front filter guide 332 from the lower side, and the projecting part 346 has contact with the front filter guide 332 from the front side.

With this structure, the front filter guide 332 and the dust box 320 can be arranged in a small sizes. The opposed part 347 of the dust box 320 enters under the front filter guide 332 so as to reduce the size in the vertical direction. The opposed part 347 and the projecting part 346 of the dust box 320 form an angle of about 90° and the projecting part 346 presses the front filter guide 332 from the front side to the rear side so that the size in the front-back direction can be reduced.

The fixing part 344 can press and fix the front filter guide 332 so that the front filter guide 332 is not moved in the front-back direction. Therefore, the filter cleaning device 300 which surely and inexpensively conveys the filter 140 without increasing the number of components can be obtained. In the above filter cleaning device 300, the filter 140 is not removed from the conveyance gear 333, and it is not necessary to provide a new pressing member other than the projecting part 346 which is integrally molded with the dust box 320.

The front filter guide 332 is pressed by the fixing part 345 included in the dust box 320 from the lower side to the upper side. The fixing part 345 is arranged on the side opposed to the front filter guide 332 and on the upper surface side of the dust box 320. The fixing part 345 may be the surface of the opposed part 347 of the dust box 320. However, in the present embodiment, the fixing part 345 is a rib provided on the surface of the opposed part 347 and presses and fixes the front filter guide 332 by contacting the front filter guide 332. Therefore, the fixing part 345 has contact with the front filter guide 332 from the lower side and a force is applied to the upper side by attaching the dust box 320, and accordingly, the front filter guide 332 can be fixed.

By fixing the front filter guide 332 with the fixing part 345 included in the opposed part 347 on the top face of the dust box 320, the front filter guide 332 is fixed in the width direction. Therefore, a case does not occur where both sides of the front filter guide 332 are fixed and the center part is not firmly fixed and the center part is slightly moved in the front-back direction. Therefore, a malfunction does not occur in which the filter 140 is not firmly engaged with the conveyance gear 333 and the filter 140 is removed from the conveyance gear 333.

The fixing part 345 can press and fix the front filter guide 332 so that the front filter guide 332 is not moved in the front-back direction. Therefore, the filter cleaning device 300 which surely and inexpensively conveys the filter 140 without increasing the number of components can be obtained. In the above filter cleaning device 300, the filter 140 is not removed from the conveyance gear 333, and it is not necessary to provide a new pressing member.

When one of the fixing parts 344 and 345 is included, the effect described above can be obtained. However, to obtain a larger effect, it is preferable to include both the fixing parts 344 and 345.

As another unit, which is not shown, to press the front filter guide 332 from the front side, a push rib may be formed which is projected from a part which is on the rear surface of the front panel 150 attached to the indoor unit body 110 and faces the front filter guide 332. The push rib may press the front filter guide 332 from the front side to the rear side. Also, in this case, the filter cleaning device 300 which can surely and inexpensively convey the filter 140 without providing a new pressing member and without increasing the number of components can be obtained.

A lifting rib 348 to lift the dust box 320 is projected from a bottom surface part of the dust box 320. By providing the lifting rib 348, the inclination of the dust box 320 in the front-back direction caused by variation of the size can be prevented. That is, when the dust box 320 is inclined forward, it is hard to apply the force to the rear side by the fixing part 344. Therefore, this situation can be prevented by providing the lifting rib 348. Also, the dust box 320 can be easily attached by contacting the lifting rib 348 with the frame of the filter conveying guide 312 and not contacting the entire lower surface of the dust box 320 with it.

It is preferable that the lifting rib 348 have a spherical shape. By forming the lifting rib 348 in the spherical shape, the lifting rib 348 is hardly hooked to the frame of the filter conveying guide 312 when the dust box 320 is attached. Therefore, the dust box 320 can be smoothly attached. Also, it is preferable that at least two or more lifting ribs 348 be provided on both sides of the dust box 320 in the width direction. In this way, the dust box 320 is not inclined in the vertical direction, and the dust box 320 is not inclined in the front-back direction across the entire dust box 320 in the width direction. Therefore, the fixing part 344 can surely press and fix the front filter guide 332 from the front side to the rear side.

In this way, in the present embodiment, regarding the dust box 320, the front filter guide 332 is fixed at the attachment position of the front filter guide 332 in the device body 310 by pressing the front filter guide 332. Therefore, according to the present embodiment, the front filter guide 332 can be surely fixed.

In the dust box 320, the front filter guide 332 is fixed at the attachment position by pressing the front filter guide 332 at least to the rear side. Specifically, on the upper surface of the dust box 320, the opposed part 347 opposed to the front filter guide 332, the projecting part 346 projected from the position on the front side of the opposed part 347 in a plate-shape are provided. The dust box 320 presses the front filter guide 332 to the rear side by using one of both surfaces of the projecting part 346 in the thickness direction.

The dust box 320 presses the front filter guide 332 at least upward and fixes the front filter guide 332 at the attachment position. Specifically, the dust box 320 presses the front filter guide 332 upward by using the surface of the opposed part 347.

The lifting rib 348 for pressing the filter conveying guide 312 is provided on the lower surface of the dust box 320. It is preferable that the lifting rib 348 have a hemispherical shape. Also, it is preferable that the plurality of lifting ribs 348 be arranged along the horizontal direction of the dust box 320.

In the present embodiment, the dust box 320 has a box-like shape having the cross section which substantially has a shape of a trapezoid. The top and bottom sides of the trapezoid are parallel to each other, and the top side is longer than the bottom side. The dust box 320 is provided in a space between the front panel 150 and the heat exchangers 131 and 132 in the front-back direction. The front surface of the dust box 320 is substantially flat and is exposed to the user of the air conditioner when the front panel 150 is opened. The lower surface of the dust box 320 is substantially flat and is arranged on the frame of the filter conveying guide 312. The rear surface of the dust box 320 is obliquely inclined backward from the lower side to the upper side. The rear surface of the dust box 320 is opposed to the heat exchangers 131 and 132 provided on the rear side and is exposed.

The oblique inclination to the rear side of the rear surface of the dust box 320 from the lower side to the upper side generates a space on the lower and rear side. A part of the air cleaner 200 can be housed in the space. Therefore, the depth length of the indoor unit 100 of the air conditioner can be reduced.

In the present embodiment, a part of the filter conveying guide 312 forms the supporting part 500. The supporting part 500 removably holds the air cleaner 200 for cleaning the air which has passed through the filter 140.

The air cleaner 200 is provided on the rear side of the dust box 320 placed on the rear side of the front panel 150 and on the front side the heat exchangers 131 and 132. The user of the air conditioner can take out the air cleaner 200 and performs maintenance such as cleaning. The user of the air conditioner can easily take out the air cleaner 200 by grabbing the handle 233 of the air cleaner 200 by one's hands.

The air cleaner 200 is arranged below the filter housing guide 313 and between the dust box 320 and the heat exchangers 131 and 132. In this way, wind from the above can easily pass through the air cleaner 200, and the depth length and the height length of the indoor unit 100 of the air conditioner can be reduced by efficiently using a dead space below the filter housing guide 313 and between the dust box 320 and the heat exchangers 131 and 132.

As illustrated in FIGS. 2 and 6, a part of the handle 233 of the air cleaner 200 is obliquely inclined downward from the rear side to the front side. It is preferable that both the inclined part and the inclined face part 342 of the dust box 320 be inclined at substantially equal angles. The substantially equal angles mean angles having a difference equal to or less than 30°.

When the user of the air conditioner places the air cleaner 200 after the maintenance, there is a possibility that the user of the air conditioner inserts the air cleaner 200 to the middle and the user only places the air cleaner 200. In this case, disconnection of electrical contact of the air cleaner 200 causes a loose connection or discharge in the air. This lowers the quality such as generation of a noise.

In the present embodiment, even when the air cleaner 200 is not correctly attached, the rear surface including the inclined face part 342 of the dust box 320 has contact with the handle 233 of the air cleaner 200. In this way, an operation of the user of the air conditioner for attaching the dust box 320 forcibly pushes the air cleaner 200 backward and downward while the rear surface of the dust box 320 has contact with the handle 233 regardless of the intention of the user of the air conditioner. Therefore, the air cleaner 200 is automatically attached to the supporting part 500 formed in the filter conveying guide 312.

When the length of the inclined face part 342 is equal to or more than half of the length of the entire rear surface, an area of the rear surface of the dust box 320 having contact with the handle 233 of the air cleaner 200 is increased. While sliding the handle 233 of the air cleaner 200 downward or slipping the handle 233 of the air cleaner 200 downward, the handle 233 of the air cleaner 200 can be surely guided downward.

The rear surface of the dust box 320 includes two or more surfaces including the inclined face part 342 and a part other than the inclined face part 342 extending in the vertical direction so that the dust removing brush can be easily provided in the dust collecting chamber 324. That is, when the rear surface of the dust box 320 is formed of two or more surfaces of the inclined face part 342, the volume of the dust collecting chamber 324 is larger than that in a case where the rear surface of the dust box 320 is formed of a single surface of the inclined face part 342.

When the height of the inclined face part 342 of the rear surface of the dust box 320 is higher than that of a part other than the inclined face part 342 of the rear surface, an area having contact with an extending part 52 is increased. Therefore, while sliding the handle 233 of the air cleaner 200 downward or slipping the handle 233 of the air cleaner 200 downward, the handle 233 of the air cleaner 200 can be surely guided downward.

In the present embodiment, the dust box 320 fixes the air cleaner 200 at the holding position of the air cleaner 200 in the filter conveying guide 312 by pressing the air cleaner 200. That is, the dust box 320 fixes the air cleaner 200 to the supporting part 500 by pressing the air cleaner 200. Therefore, according to the present embodiment, the air cleaner 200 is easily attached to the correct position in the filter cleaning device 300.

At least a part of the rear surface of the dust box 320 is obliquely inclined downward, and the inclined face part 342 which is the inclined part presses the air cleaner 200. For example, the dust box 320 presses the handle 233 provided in the lower part on the front surface of the air cleaner 200 backward and downward by the inclined face part 342.

When the surface area of the inclined face part 342 is larger, the dust box 320 can surely press the air cleaner 200 to the correct position by the inclined face part 342. Therefore, it is preferable that the length of the inclined face part 342 on the rear surface of the dust box 320 in the front-back direction be longer than the length of the other part on the rear surface in the front-back direction. Also, it is preferable that the length of the inclined face part 342 on the rear surface of the dust box 320 in the vertical direction be longer than that of the other part on the rear surface in the vertical direction.

The entire rear surface of the dust box 320 may be the inclined face part 342. However, in this case, the volume of the dust collecting chamber 324 is reduced. Therefore; it is preferable that the dust box 320 have a part vertically extending from a part of the rear surface. That is, it is preferable that the part other than the inclined face part 342 on the rear surface of the dust box 320 be vertically extended.

In the present embodiment, as described above, the inclined face part 342 is provided on the rear surface of the dust box 320. Therefore, when the dust box 320 is attached to the front side of the filter conveying guide 312 in a state where the air cleaner 200 is positioned in front of the holding position of the air cleaner 200 in the filter conveying guide 312, the air cleaner 200 is pushed into and is fixed to the correct holding position by the dust box 320.

\*\*\*Description of Effect\*\*\*

In the present embodiment, at least a part of one first plate-shaped electrode 223 from among the plurality of first plate-shaped electrodes 223 is fitted into the slit 237 of the frame part 230. According to this, the plurality of first plate-shaped electrodes 223 is positioned. Therefore, the intervals between the first plate-shaped electrodes 223 and the second plate-shaped electrodes 224 become more even.

In the present embodiment, the first terminal 227 and the second terminal 228 are attached to the end of the plurality of first plate-shaped electrodes 223 and the plurality of second plate-shaped electrodes 224 arranged in the first direction D1 and at the position separated in the third direction D3 perpendicular to both the first direction D1 and the second direction D2 in which the first connection member 225 and the second connection member 226 are overlapped to each other. According to this, the first terminal 227 and the second terminal 228 can be arranged in a small space. Therefore, the air cleaner 200 can be miniaturized.

In the present embodiment, a hole is provided in the upper surface 510 of the supporting part 500. The third terminal 411 and the fourth terminal 412 included in the power supply unit 400 are projected through the hole. When the air cleaner 200 is placed on the upper surface 510 of the supporting part 500, the first terminal 227 and the second terminal 228 included in the air cleaner 200 respectively have contact with the third terminal 411 and the fourth terminal 412. Accordingly, the attachment and the electrical connection of the air cleaner 200 can be concurrently performed. Therefore, the air cleaner 200 can be easily attached/removed.

In the present embodiment, the center position of the air cleaner 200 in the height direction is a position lower than the connection part 134 between the upper heat exchanger 131 and the lower heat exchanger 132. Since the air cleaner 200 hardly prevents the air flow, the efficiency of the air conditioner is improved.

In the present embodiment, the power supply unit 400 is housed in the lower part of the front surface of the indoor unit body 110. Since the power supply unit 400 is not positioned in the air trunk, the efficiency of the air conditioner is improved.

In the present embodiment, the air cleaner 200 is supported by a part of the device body 310 of the filter cleaning device 300. Therefore, the air cleaner 200 can be provided apart from the heat exchangers 131 and 132.

In the present embodiment, the air cleaner 200 is built in the air conditioner and used. Nevertheless, an air cleaner having the same structure may be built in a different appliance and used. The different appliance includes a cleaner, a hand drier, an air freshener, a humidifier, a dehumidifier, an exhaust fan, an elevator, a refrigerator, a car, and a train. These appliances each include a frame body for housing the air cleaner, and the air cleaner is mounted to each of the appliances by using the frame body, thereby effectively removing or inactivating bacteria, molds, and virus in the air. As a result, the air is cleaned, and the user of the appliance feels more comfortable.

The embodiment of the present invention has been described above. Nevertheless, the embodiment may be partially performed. For example, from among ones described as "units" in the description of the embodiment, only one unit may be employed, or a combination of some units may be employed. The present invention is not limited to the embodiment and can be variously changed as necessary.

REFERENCE SIGNS LIST

100: indoor unit of air conditioner, 110: indoor unit body, 111: suction port, 112: blowout port, 113: drain pan, 114: drain pan, 120: blast fan, 131: heat exchanger, 132: heat exchanger, 133: heat exchanger, 134: connection part, 140: filter, 150: front panel, 160: vertical wind direction variable vane, 170: restriction unit, 200: air cleaner, 210: charging unit, 211: discharge electrode, 212: counter electrode, 213: ring-shaped terminal, 214: tube, 215: wire, 216: spring, 217: planar electrode, 220: dust collecting unit, 221: first electrode, 222: second electrode, 223: first plate-shaped electrode, 224: second plate-shaped electrode, 225: first connection member, 226: second connection member, 227: first terminal, 228: second terminal, 229: notch, 230: frame part, 231: upper frame, 232: lower frame, 233: handle, 234: opening, 235: rib, 236: opening, 237: slit, 238: projection, 239: projection, 240: prefilter, 251: first extended part, 252: second extended part, 253: first curved part, 254: second curved part, 255: first end, 256: second end, 257: third curved part, 258: erected part, 259: middle frame, 261: first hole, 262: second hole, 263: groove, 271: plate face, 272: plate face, 273: first feeding unit, 274: second feeding unit, 275: gap, 277: first restriction unit, 278: second restriction unit, 300: filter cleaning device, 310: device body, 311: insertion port, 312: filter conveying guide, 313: filter housing guide, 314: fixing part, 315: main receiving part, 320: dust box, 321: wall plate, 322: dust removing shaft, 323: stopper member, 324: dust collecting chamber, 331: filter conveying cover, 332: front filter guide, 333: conveyance gear, 341: brush hole, 342: inclined face part, 343: lid, 344: fixing part, 345: fixing part, 346: projecting part, 347: opposed part, 348: lifting rib, 400: power supply unit, 401: fixing frame, 402: electrical wire, 403: converter, 404: insulating frame, 405: metal cover, 411: third terminal, 412: fourth terminal, 500: supporting part, 501: auxiliary receiving part, 510: upper surface, 511: third hole, 512: fourth hole, 513: first wall, 514: second wall, 515: third wall, 516: fourth wall, and 520: slit

The invention claimed is:

1. An air conditioner comprising:
an air cleaner that includes a charging unit to charge particles in air and a dust collecting unit to collect the particles charged by the charging unit by an electrostatic force;
a filter cleaning device that includes a device body to house a filter for capturing dust in the air in a movable form, and a part of the device body forms a supporting part, which is configured to support the air cleaner; and
an indoor unit body that houses the filter cleaning device and houses the air cleaner, wherein
the filter cleaning device further includes a dust box that is removably attached to a front surface of the device body and accumulates the dust captured by the filter,
the indoor unit body houses the air cleaner behind the dust box,
the indoor unit body removably houses the air cleaner, and
an insertion port is provided in the filter cleaning device, and both the air cleaner and the dust box are inserted into the insertion port.

2. The air conditioner according to claim 1, further comprising a heat exchanger that exchanges heat between the air and a refrigerant, wherein the supporting part extends from a front surface of the device body toward the heat exchanger and does not have contact with the heat exchanger.

3. The air conditioner according to claim 2, wherein the indoor unit body removably houses the air cleaner, and the air conditioner further comprises a restriction unit to restrict a range in which the air cleaner can enter the indoor unit body in a front-to-back direction to prevent contact between the air cleaner and the heat exchanger.

4. The air conditioner according to claim 2, wherein the indoor unit body removably houses the air cleaner, and the air conditioner further comprises a restriction unit to restrict a range in which the air cleaner can move in a horizontal direction of the indoor unit body such that the horizontal range of the air cleaner corresponds to that of the filter.

5. The air conditioner according to claim 4, wherein a size of the air cleaner in the horizontal direction corresponds to that of the filter.

6. The air conditioner according to claim 1, wherein the supporting part is arranged in a range from a left end or a right end of the insertion port to a position inside the indoor unit body in a front-to-back direction.

7. The air conditioner according to claim 1, wherein the air cleaner is inserted into the insertion port in a state in which a longitudinal direction of the air cleaner is horizontal.

8. An air conditioner comprising:
an air cleaner that includes a charging unit to charge particles in air and a dust collecting unit to collect the particles charged by the charging unit by an electrostatic force;

a filter cleaning device that includes a device body to house a filter for capturing dust in the air in a movable form, and a part of the device body forms a supporting part, which is configured to support the air cleaner; and an indoor unit body that houses the filter cleaning device and houses the air cleaner, wherein the filter cleaning device further includes a dust box that is removably attached to a front surface of the device body and accumulates the dust captured by the filter, the indoor unit body houses the air cleaner behind the dust box, the indoor unit body removably houses the air cleaner, an insertion port is provided in the filter cleaning device, and both the air cleaner and the dust box are inserted into the insertion port, another part of the device body forms a main receiving part to support the dust box, the supporting part includes an auxiliary receiving part next to the main receiving part to support the dust box together with the main receiving part, and upper surfaces of the main receiving part and the auxiliary receiving part form a wall surface of a lower side of the insertion port.

9. The air conditioner according to claim 8, wherein a ridge line of the upper surface of the main receiving part viewed from a side corresponds to that of the upper surface of the auxiliary receiving part.

10. The air conditioner according to claim 1, further comprising a power supply unit to apply a voltage to generate the electrostatic force to the dust collecting unit, wherein the filter cleaning device is arranged on each of left and right sides of the indoor unit body, the air cleaner is held at either a right end of the filter cleaning device on the left side or a left end of the filter cleaning device on the right side, and the power supply unit is arranged at a center of the indoor unit body in a horizontal direction.

11. The air conditioner according to claim 1, comprising a power supply unit to apply a voltage to generate the electrostatic force to the dust collecting unit, wherein the filter cleaning device is arranged on each of left and right sides of the indoor unit body, the air cleaner is held at a left end of the filter cleaning device on the left side, and the power supply unit is arranged at a left end of the indoor unit body.

12. The air conditioner according to claim 1, further comprising a power supply unit to apply a voltage to generate the electrostatic force to the dust collecting unit, wherein the filter cleaning device is arranged on each of left and right sides of the indoor unit body, the air cleaner is held at a right end of the filter cleaning device on the right side, and the power supply unit is arranged at a right end of the indoor unit body.

* * * * *